United States Patent
Thirumalai et al.

(10) Patent No.: US 10,362,310 B2
(45) Date of Patent: Jul. 23, 2019

(54) ENTROPY CODING TECHNIQUES FOR DISPLAY STREAM COMPRESSION (DSC) OF NON-4:4:4 CHROMA SUB-SAMPLING

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 98 days.

(21) Appl. No.: 15/296,998

(22) Filed: Oct. 18, 2016

(65) Prior Publication Data

US 2017/0118473 A1    Apr. 27, 2017

Related U.S. Application Data

(60) Provisional application No. 62/244,691, filed on Oct. 21, 2015.

(51) Int. Cl.
*H04N 7/12* (2006.01)
*H04N 19/13* (2014.01)
(Continued)

(52) U.S. Cl.
CPC ........... *H04N 19/13* (2014.11); *H04N 19/119* (2014.11); *H04N 19/122* (2014.11); *H04N 19/124* (2014.11); *H04N 19/132* (2014.11); *H04N 19/15* (2014.11); *H04N 19/182* (2014.11); *H04N 19/436* (2014.11); *H04N 19/46* (2014.11); *H04N 19/50* (2014.11);
(Continued)

(58) Field of Classification Search
CPC ...... H04N 19/13; H04N 19/46; H04N 19/436; H04N 19/182; H04N 19/122; H04N 19/119; H04N 19/124; H04N 19/50; H04N 19/132; H04N 19/15; H04N 19/625; H04N 19/186; H04N 19/176
USPC ...................................................... 375/240.03
See application file for complete search history.

(56) References Cited

U.S. PATENT DOCUMENTS

| | | | |
|---|---|---|---|
| 2013/0034152 A1* | 2/2013 | Song ................... | H04N 19/119 375/240.03 |
| 2014/0003530 A1* | 1/2014 | Sole Rojals ......... | H04N 19/129 375/240.18 |

(Continued)

OTHER PUBLICATIONS

International Search Report and Written Opinion—PCT/US2016/057740—ISA/EPO—dated Mar. 31, 2017.

(Continued)

*Primary Examiner* — Richard T Torrente
(74) *Attorney, Agent, or Firm* — Shumaker & Sieffert, P.A.

(57) ABSTRACT

Provided are systems and methods for entropy encoding video data. Samples of a block of video data are partitioned into one or more groups of samples, based upon a coding mode of the block and a chroma subsampling image format of the samples. Entropy coding is performed on the block via performing a group-wise skip on at least one of the one or more groups in response to all of the samples in the at least one group having a value equal to a predetermined value, the group-wise skip including refraining from encoding the samples associated with the at least one group.

24 Claims, 19 Drawing Sheets

(51) Int. Cl.
  *H04N 19/124* (2014.01)
  *H04N 19/132* (2014.01)
  *H04N 19/15* (2014.01)
  *H04N 19/46* (2014.01)
  *H04N 19/50* (2014.01)
  *H04N 19/625* (2014.01)
  *H04N 19/119* (2014.01)
  *H04N 19/122* (2014.01)
  *H04N 19/182* (2014.01)
  *H04N 19/436* (2014.01)
  *H04N 19/176* (2014.01)
  *H04N 19/186* (2014.01)

(52) U.S. Cl.
  CPC ......... *H04N 19/625* (2014.11); *H04N 19/176* (2014.11); *H04N 19/186* (2014.11)

(56) References Cited

U.S. PATENT DOCUMENTS

| | | | | |
|---|---|---|---|---|
| 2014/0092983 | A1* | 4/2014 | Joshi | H04N 19/176 375/240.18 |
| 2016/0007038 | A1* | 1/2016 | Chou | H04N 19/46 375/240.03 |
| 2016/0007050 | A1* | 1/2016 | Rusert | H04N 19/56 375/240.08 |
| 2016/0080749 | A1* | 3/2016 | He | H04N 19/13 375/240.02 |

OTHER PUBLICATIONS

"ITU-T Recommendation H.262, International Standard ISO/IEC 13818.2 MPEG-2 Video. Transmission Of Non-Telephone Signals. Information Technology—Generic Coding of Moving Pictures and Associated Audio Information: Video", ITU-T Telecommunication Standarization Sector of ITU, Geneva, CH, Jul. 1, 1995 (Jul. 1, 1995), XP000198491, pp. 1-211.

Partial International Search Report—PCT/US2016/057740—ISA/EPO—dated Feb. 10, 2017.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Response to Written Opinion dated Mar. 31, 2017, from International Application No. PCT/US2016/057740, filed on Jun. 23, 2017, 18 pp.

International Preliminary Report on Patentability from International Application No. PCT/US2016/057740, dated Feb. 8, 2018, 11 pp.

\* cited by examiner

| Sample 0 203 | Sample 1 205 | Sample 2 207 | Sample 3 209 | Sample 4 211 | Sample 5 213 | Sample 6 215 | Sample 7 217 | Sample 8 219 | Sample 9 221 | Sample 10 223 | Sample 11 225 | Sample 12 227 | Sample 13 229 | Sample 14 231 | Sample 15 |

Group 1 — Samples 0–3
Group 2 — Samples 4–7
Group 3 — Samples 8–11
Group 4 — Samples 12–15

FIG. 3

| C00 | C01 | C02 | C03 |
|-----|-----|-----|-----|
| C04 | C05 | C06 | C07 |
| C08 | C09 | C10 | C11 |
| C12 | C13 | C14 | C15 |

FIG. 8

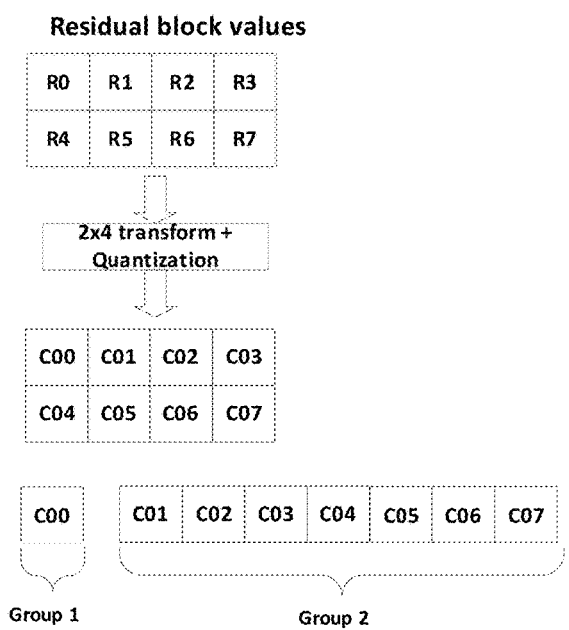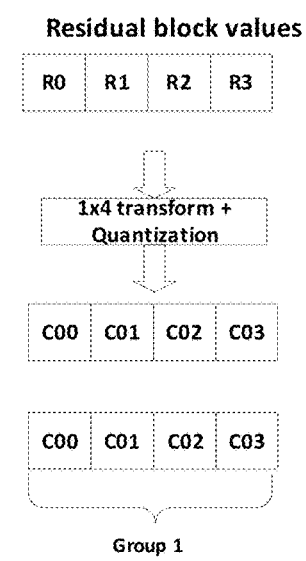
FIG. 12A
FIG. 12B

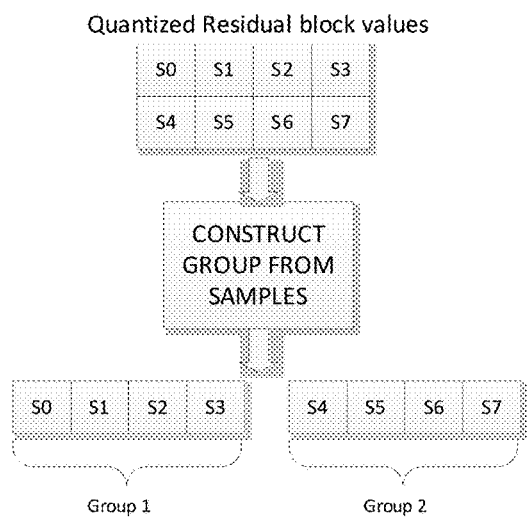 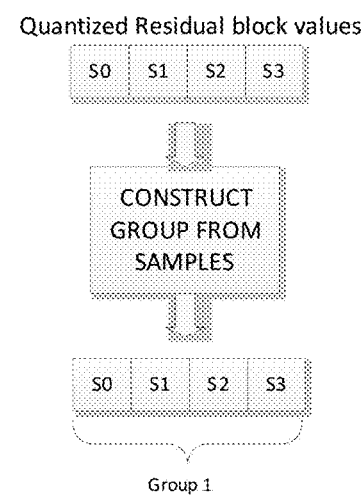
FIG. 13A
FIG. 13B under 37 CFR 1.57.

ENTROPY CODING TECHNIQUES FOR DISPLAY STREAM COMPRESSION (DSC) OF NON-4:4:4 CHROMA SUB-SAMPLING

INCORPORATION BY REFERENCE TO PRIORITY APPLICATION(S)

This application claims the benefit of U.S. Provisional Application No. 62/244,691, filed Oct. 21, 2015, which is hereby incorporated by reference under 37 CFR 1.57.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method of entropy encoding video data, may involve determining a chroma subsampling image format of a block of the video data. The method may involve partitioning the block of the video data into one or more groups of samples based at least in part on a coding mode of the block and the chroma subsampling image format of the samples. The method may involve entropy encoding the block via performing a group-wise skip on at least one of the one or more groups in response to all of the samples in the at least one group having a value equal to a predetermined value, the group-wise skip comprising refraining from encoding the samples associated with the at least one group. A device for performing certain aspects of the method is also provided.

In another aspect, a method of entropy decoding video data may involve receiving a bitstream representing a block of the video data, the block comprising one or more groups of samples, the bitstream including at least one group-wise skip value indicating that a corresponding group of samples of the block is not included in the bitstream. The method may involve generating the one or more groups of samples via entropy decoding the bitstream based at least in part on the group-wise skip value. The method may involve determining a chroma subsampling image format of the samples. The method may involve reconstructing the block based at least in part on the one or more groups of samples, a coding mode of the block, and the chroma subsampling image format. A device for performing certain aspects of the method is also provided.

In another aspect, a method of entropy encoding video data is provided. The method comprises receiving a plurality of samples associated with a color component of a block of video data. The method may further comprise determining whether the samples are to be encoded using block-wise skip. The determination may comprise determining whether all samples corresponding to the color component have a value equal to a predetermined value, the block-wise skip comprising refraining from encoding the plurality of samples. The method may further comprise, in response to determining that the samples are not be encoded using block-wise skip, determining a chroma subsampling image format of the block. The method may further comprise partitioning the block of the video data into one or more groups of samples, wherein a number of groups of the one or more groups is based at least in part on a coding mode of the block, the chroma subsampling image format of the samples, and the color component associated with the samples. The method may further comprise entropy encoding the one or more groups of samples.

In another aspect, a device for entropy encoding video data is provided. The device comprises a memory configured to store the video data. The device further comprises a processor in communication with the memory. The processor is configured to receive a plurality of samples associated with a color component of a block of video data. The processor is further configured to determine whether the samples are to be encoded using block-wise skip, the block-wise skip comprising refraining from encoding the plurality of samples. The determination comprises determining whether all samples corresponding to the color component have a value equal to a predetermined value. The processor is further configured to, in response to a determination that the samples are not to be encoded using block-wise skip, determine a chroma subsampling image format of a block of the video data. The processor is further configured to partition the block of the video data into one or more groups of samples. A number of groups of the one or more groups is based at least in part on a coding mode of the block, the chroma subsampling image format of the samples, and the color component associated with the samples. The processor is further configured to entropy encode the one or more groups of samples.

In another aspect, a method of entropy decoding video data is provided. The method comprises receiving a bitstream representing a block of the video data. The method further comprises determining whether a block-wise skip flag has been indicated for a color component of the block indicating that samples corresponding to the color component of the block are not included in the bitstream. The method further comprises, in response to a determination that the block-wise skip flag has not been indicated, determining a chroma subsampling image format of the samples. The method further comprises generating the one or more groups of samples via entropy decoding the bitstream. A number of the one or more groups is based upon the chroma subsampling image format and a color component associated with the samples. The method further comprises reconstructing the block based at least in part on one or more groups of samples, a coding mode of the block, and the chroma subsampling image format.

In another aspect, a device for entropy decoding video data is provided. The device comprises a memory configured to store at least a portion of a bitstream representing a block of the video data. The device further comprises a processor in communication with the memory. The processor is configured to determine whether a block-wise skip flag has been indicated for a color component of the block indicating that samples corresponding to the color component of the block are not included in the bitstream. The processor is further configured to, in response to a determination that the block-wise skip flag has not been indicated, determine a chroma subsampling image format of the samples. The processor is further configured to generate the one or more groups of samples via entropy decoding the bitstream, wherein a number of the one or more groups is based upon the chroma subsampling image format and a color component associated with the samples. The processor is further configured to reconstruct the block based at least in part on the one or more groups of samples, a coding mode of the block, and the chroma subsampling image format.

BRIEF DESCRIPTION OF THE DRAWINGS

FIG. 3 is a diagram illustrating a method of partitioning a block for a prediction coding mode in accordance with aspects described in this disclosure.

FIG. 8 is a diagram illustrating another method of partitioning a block for a transform coefficient coding mode in accordance with aspects described in this disclosure.

FIGS. 12A-B illustrate example grouping techniques for chroma components for the coding of quantized transform coefficients.

FIGS. 13A-B illustrate example grouping techniques for chroma components for the coding of quantized block residuals.

DETAILED DESCRIPTION

Figure 1A:
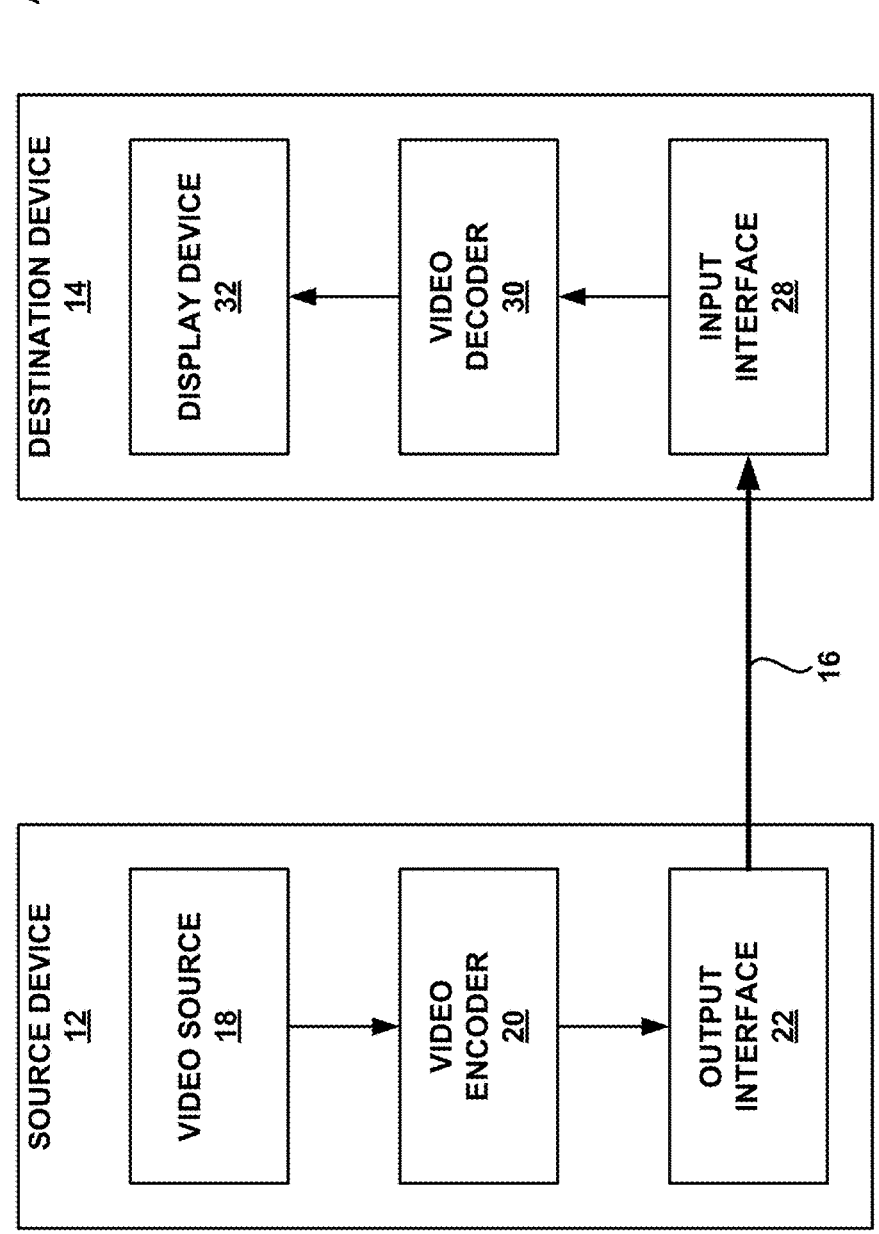
FIG. 1A is a block diagram illustrating an example video encoding and decoding system that may utilize techniques in accordance with aspects described in this disclosure.

In general, this disclosure relates to methods of improving video compression techniques such as display stream compression (DSC). More specifically, the present disclosure relates to systems and methods for entropy coding including partitioning a video data block into a plurality of groups of samples, including non-4:4:4 chroma sub-sampling image formats.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

Entropy coding is a method of coding information that generally includes representing each unique symbol of the information with a variable-length codeword. In entropy coding, more common symbols are typically represented using shorter codewords. Accordingly, since the more common symbols are represented using fewer bits based on the use of shorter codewords, the information can be compressed.

Version 1.0 of the DSC standard proposes delta size unit-variable length coding (DSU-VLC) semantics. In version 1.0 of the DSC standard, each DSU-VLC unit codes the residual values of a group of pixels using prefix and suffix parts. At least one aspect of this disclosure relates to the incorporation of entropy coding principles into DSU-VLC style coding semantics (which will hereinafter be generally referred to interchangeably with DSU-VLC). Accordingly, at least one aspect of this disclosure can integrate the coding efficiencies associated with entropy coding into the DSU-VLC semantics.

A number of popular entropy coding techniques exist, such as Huffman, Arithmetic, Exponential-Golomb, Rice codes etc. However, these techniques typically have a limited throughput of 1 sample/clock, which may be too low for certain applications such as high resolution displays and panels. That is, conventional coding hardware may not have a sufficient clock rate to be able to take advantage of the popular entropy coding techniques while maintaining a visually lossless coding rate, as is desirable in certain coding standard such as the DSC standard. Accordingly, at least one aspect of this disclosure relates to entropy coding techniques which have higher throughputs, for example, a throughput of 4 samples/clock. Another aspect of this disclosure relates to the extension of high-throughput entropy coding techniques for non-4:4:4 chroma sub-sampling image formats. For example, the techniques disclosed herein are applicable to 4:2:2 and 4:2:0 chroma sub-sampling.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
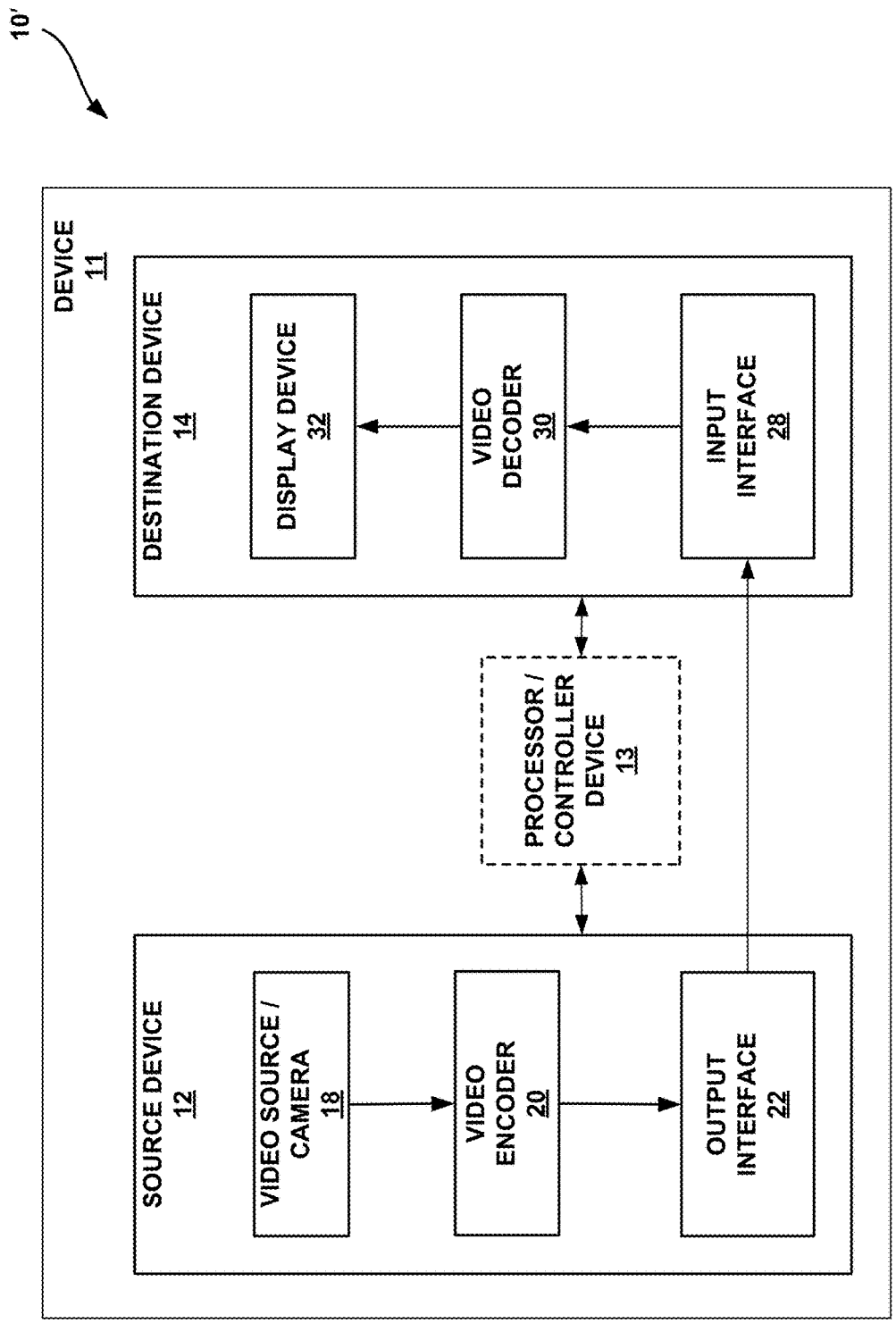
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
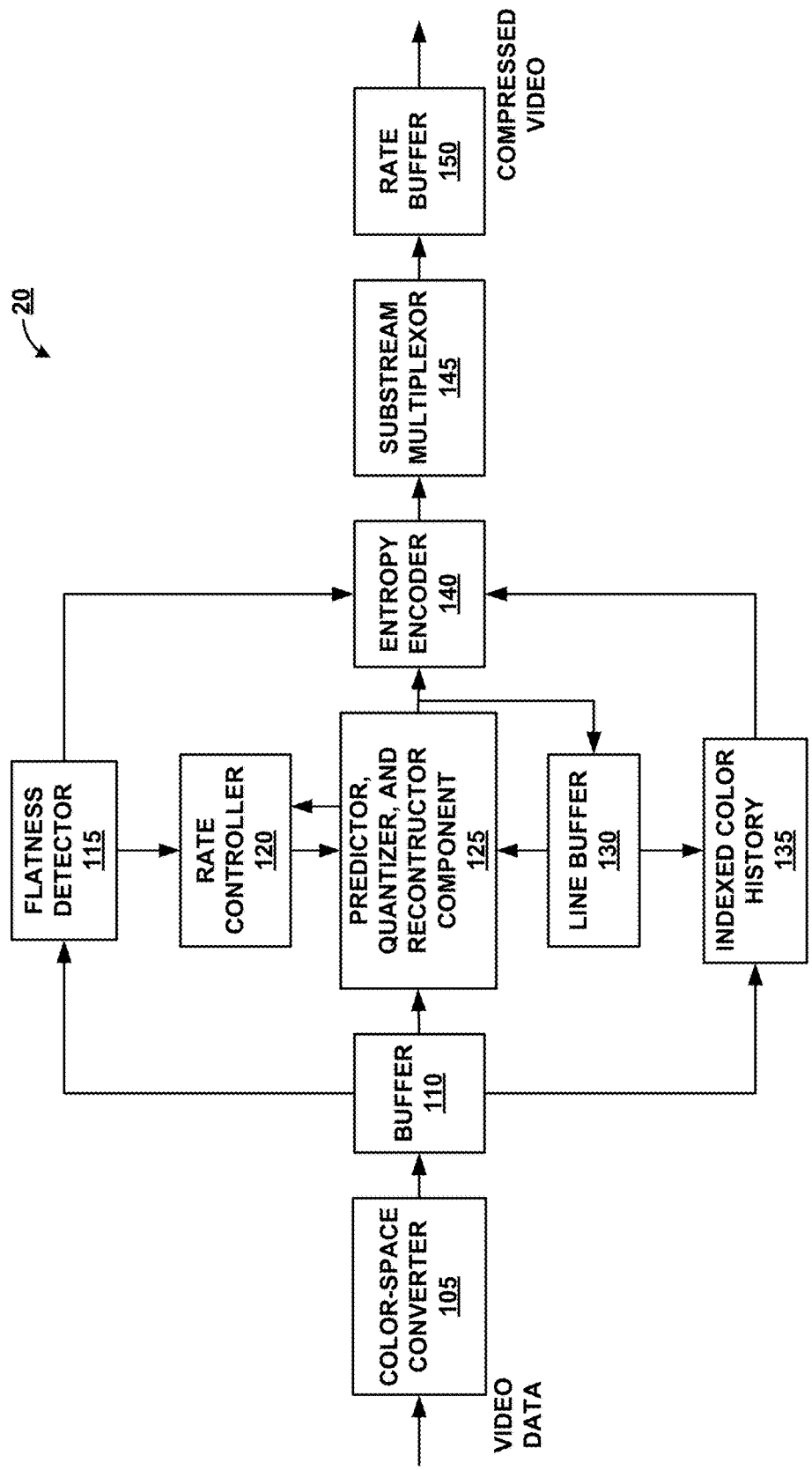
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. As further discussed below with reference to FIGS. 3-6, the predictor, quantizer, and reconstructor component 125 may be configured to predict (e.g., encode or decode) the block of video data (or any other unit of prediction) by performing the methods illustrated in FIGS. 3-6.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
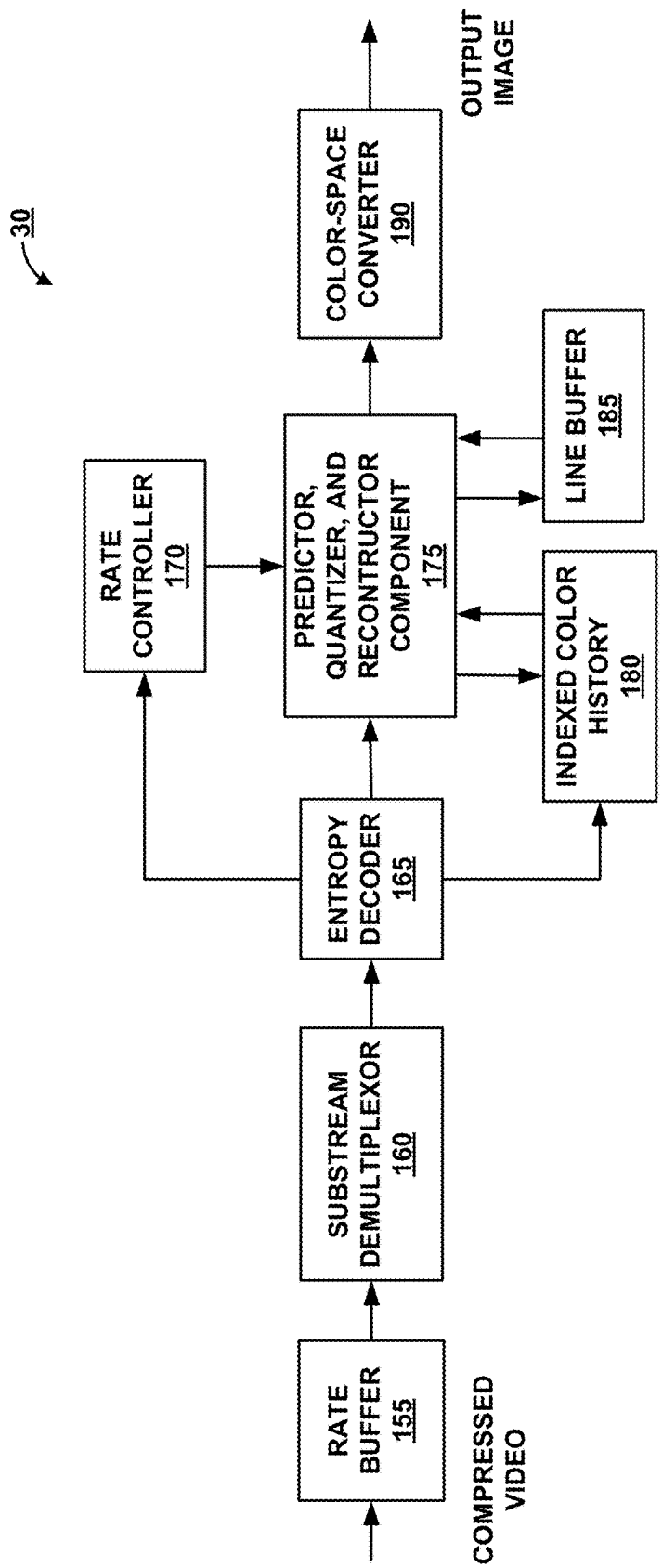
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexer 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the target bits allocated to encode each slice may be substantially constant.

Quantization Parameter (QP)

As described above, video coding may include the quantization of the video data via, for example, the predictor, quantizer, and reconstructor component 125. Quantization may introduce loss into a signal and the amount of loss can be controlled by the QP determined by the rate controller 120. Rather than storing the quantization step size for each QP, a scaling matrix may be specified as a function of the QP. The quantization step size for each QP may be derived from the scaling matrix, and the derived value may not necessarily be a power of two, i.e., the derived value can also be a non-power of two.

Skip Mode

When all the values of a single color coordinate in a given block are zero, then the color coordinate value of the block can be effectively coded using skip mode. In certain implementations of skip mode coding, a 1-bit flag or a skip value may be signaled to the decoder to indicate whether the values of a color component of the current block are coded using skip mode (if all values of the color component of the current block are zero) or not in skip mode (if at least one of the values of the color component the current block is non-zero). In skip mode, when all of the values of a color component of the current block are zero, the 1-bit flag may be signaled to the decoder and the coder may refrain from coding the values of the color component of the block (i.e., the coding of the values of the color component of the block may be skipped). Skip mode may also be applied to a group of values of a color component having a size that is smaller than a block, or to a group of multiple blocks. Skip mode may also be applied separately for each color component of a block, for example, when all of the values of a color component of the current block are zero, skip mode may be applied to the values of the color component of the current block. In some implementations, skip mode may be applied to all of the color components of a group or block. As described in greater detail below, skip mode may also be applied to units that are smaller than a block.

Entropy Coding in DSC v1.0

As discussed above, in DSC v1.0, DSU-VLC has been proposed. In DSU-VLC, the residual values of each unit (a unit including samples of a color component of one group, where each group has 3 pixels) is coded using prefix and suffix parts. The prefix part indicates the size (for example, the number of bits) of the residual values that follow in the suffix part and the suffix part indicates the actual residual values of the three samples in the unit. All three residual values in the group are coded in two's complement using the same number of bits as indicated by the prefix part.

For the prefix part, instead of coding the actual size of the residual values of the current unit, the prefix values are predictive coded, where the size of the residual values of the current unit is predicted based on a size of residual values of a previous unit of the same component and also by considering the changes in the quantization parameters between the current unit and the previous unit. For example, let the values requiredSize[0], requiredSize[1] and requiredSize[2] respectively represent the required sizes of the quantized residual values of the previous group. From this, the predicted size can be calculated as:

predictedSize=(requiredSize[0]+requiredSize[1]+
2*requiredSize[2]+2)>>2

By considering the difference in the quantization parameter between the current unit and previous unit, the predicted size can be adjusted as:

adjPredictedSize=CLAMP(predictedSize−qLevel-
Change,0,maxSize−1)

Here, the value maxSize is the current color coordinate's maximum possible residual value and the CLAMP function is defined as:

CLAMP(X,MIN,MAX)((X)>(MAX)?(MAX):((X)<
(MIN)?(MIN):(X)).

Finally, the non-negative difference between the size of the residuals of the current unit and the predicted size can be unary coded. A negative difference is indicated by coding a zero value, for example, no change in the size of the residuals.

In this context, existing entropy coding techniques, such as Huffman, Arithmetic, Exponential-Golomb, Rice codes, etc. have a limited throughput of 1 sample/clock which may be too low for certain applications, e.g., high resolution displays and panels. That is, visually lossless entropy coding of video data for high resolution displays and panels, for example, 4K displays, using conventional hardware may not be economically feasible.

To overcome the above-described issues with existing approaches for DSC, this disclosure describes improvements below. In this disclosure, the following described techniques and approaches may be used solely or in any combination with one another.

In accordance with one or more aspects of the present disclosure, described herein is an entropy coding technique that provides a higher throughput (e.g., 4 samples/clock). In one example, the techniques disclosed herein may be applicable to a 4:4:4 image format. However, other throughput values can also be achieved based on the specific implementation.

In related aspects, disclosed herein is a DSC coder that provides low cost, fixed rate visually lossless compression. The coder is designed based on a block-based approach (e.g., with block size P×Q) and may be implemented with one or more of a multitude of coding modes. For example, available coding options for each block include transform mode (e.g., DCT, Hadamard), block prediction mode, differential pulse-code modulation (DPCM) mode, pattern mode, mid-point prediction (MPP) mode, and/or mid-point predication fall back (MPPF) mode. Several coding modes may be used in the coder to compress different types of content or images. For example, text images may be compressed via pattern mode, while a natural image may be captured via transform mode.

In further related aspects, a coding mode may be selected and utilized for each block from among a plurality of candidate coding modes based on a rate-control technique for selecting the optimal mode(s) for each block by considering both the rate and the distortion of the candidate mode. The rate-control technique may involve utilizing a buffer model, and a design consideration of the codec may include making sure that the buffer is not in a state of underflow (e.g., fewer than zero bits in the buffer) or overflow (e.g., buffer size has increased past a set/defined maximum size).

Features of the entropy coding technique of the present disclosure, as compared to the DSU-VLC implemented in DSC v1.0, may include but are not limited to the following.

Coding of Quantized Block Residuals: The principles of skip and DSU-VLC coding may be combined in a way such that each group is DSU-VLC coded only if each group has at least one non-zero value.

Coding of Transform Coefficients: The quantized transform coefficients (for example, discreet cosine transform (DCT)) of each block may be coded by first constructing groups from the quantized transform coefficients and then coding each group using similar principles of DSU-VLC. Further, skip and DSU-VLC coding may be combined to code the quantized transform coefficients of each group.

Prefix Prediction: The size of the current group may, for example, be predicted based only on the maximum required size of the previous group. Further, while predicting the sizes, the entropy coding technique may monitor, consider, and/or factor in the effect of the QP, especially when the quantization step size is not a power of 2.

Prefix Coding: Both the negative and positive differences of the current size and the predicted size may be coded.

Further details regarding the above aspects are provided below. It is noted that the entropy coding technique described herein may, for example, be independently applied to code each color component in the block.

Coding of Quantized Block Residuals

FIG. 3 is a diagram illustrating a method of partitioning a block for a prediction coding mode, for example, block predication mode or DPCM mode, in accordance with aspects described in this disclosure. In the example of FIG. 3, the block includes sixteen samples 201 to 231, where each sample is, for example, a quantized residual. In one implementation, each component of the quantized residuals 201 to 231 in the block may, for example, be entropy coded according to the steps below. The diagram illustrated in FIG.

3 may also apply to reconstructing the block based on a plurality of partitioned groups for a prediction coding mode.

The samples 201 to 231 in the block may be partitioned into 4 groups as illustrated in the example of FIG. 3. However, the block may have an arbitrary number of samples which can be partitioned into an arbitrary number of groups. Further, the throughput of the entropy coding techniques described in this disclosure may be related to the number of groups in the block. Depending on the implementation, the samples 201 to 231 may be for example, 1D prediction residuals, and/or block-prediction residuals, and/or intra-prediction residuals, and/or 2D median adaptive predicted residuals. However, depending on the embodiment, the samples can represent any other type of residual.

Although a uniform grouping strategy is illustrated in the example of FIG. 3, in further related aspects, a non-uniform grouping strategy may be constructed, wherein the numbers of samples in each group are not the same.

In the following description, groups of samples are illustrated by being enclosed in braces. In the example illustrated in FIG. 3, groups 1, 2, 3, and 4 are constructed with the samples {201 to 207}, {209 to 215}, {217 to 223}, and {225 to 231}, respectively. In another example (not illustrated), groups 1, 2, 3, and 4 may be constructed with the samples {201 to 203}, {205 to 209}, {211 to 219}, and {221 to 231}, respectively. In yet another example (not illustrated), groups 1, 2, 3, and 4 may be constructed with the samples {201}, {203 to 207}, {209 to 217}, and {219 to 231}, respectively. In yet another example (not illustrated), groups 1, 2, 3, and 4 may be constructed with the samples {201}, {203 and 205}, {207 to 217}, and {219 to 231}, respectively. In yet another example (not illustrated), groups 1, 2, 3, and 4 may be constructed with the samples {201}, {203 to 209}, {211 to 219}, and {221 to 231}, respectively. However, the above-listed groupings of samples are merely examples and other methods of partitioning of the block into a plurality of groups can be performed.

Although the above description has illustrated and described a number of grouping techniques that may be used in partitioning a block, the reverse techniques may be applied when reconstructing the block. For example, when a block has been partitioned into four groups of samples as shown in FIG. 3, the block can be reconstructed to include the samples 201 to 231. This also applies to the other above-described grouping strategies that do not have the same number of samples in each group.

When all the samples associated with a particular color coordinate in the block have a value of zero, then those samples associated with that color coordinate of the block may be coded using skip mode, e.g., a 1-bit flag per block (per color coordinate) may be signaled to indicate if the current color coordinate in the block is encoded using skip mode or not. Accordingly, a 1-bit flag may be signaled for each color coordinate of the block to indicate whether the corresponding color coordinate of the block is coded using skip mode. In other implementations, a single 1-bit flag may be signaled for all of the color coordinates in the block. In the present disclosure, the encoding of the current color coordinate in the block via skip mode is referred to as block-wise skip mode.

For example, block-wise skip mode may not be applied to all three color coordinates. In one implementation, block-wise skip mode is applied for the chroma color coordinates but not for the luma color coordinates.

In some implementations, when at least one non-zero value is contained within one color coordinate in the block, then the entropy coding technique may involve coding each group using DSU-VLC only if the group has one non-zero value. For example, a 1-bit flag or a group skip value associated with a group may be signaled to indicate whether the group is encoded using skip mode or not. In the present disclosure, the encoding of each group via skip mode is referred to as group-wise skip mode. Similarly, the decoding of the 1-bit flag or the group skip value may also referred to as group-wise skip mode.

In some implementations, for each group, a search is carried out to determine whether all the values of the samples within the group are zero. In one example, when all the values in the group are zero, then a value (e.g., a value of '1') may be signaled to the decoder via the corresponding flag (e.g., the 1-bit flag referenced above) that indicates that all the values of the samples in the associated group equal zero. When at least one sample in the group has a non-zero value, then a value (e.g., a value of '0') may be signaled to the decoder via the corresponding flag, followed by the DSU-VLC coding of the group. In other words, the corresponding flag associated with the group may be signaled with a value that indicates that at least one sample within the group possesses a non-zero value. In another example, the value of '0' may be signaled when all the values of the samples within the group are zero and the value of '1' may be signaled when the group contains at least one sample with a non-zero value. However, depending on the embodiment, the signaling of whether group-wise skip mode has been employed for the current group can be signaled in any other suitable manner, for example, by signaling an indication of whether group-wise skip has been employed by the current-group via a plurality of bits.

Coding of Transform Coefficients

Figure 4:
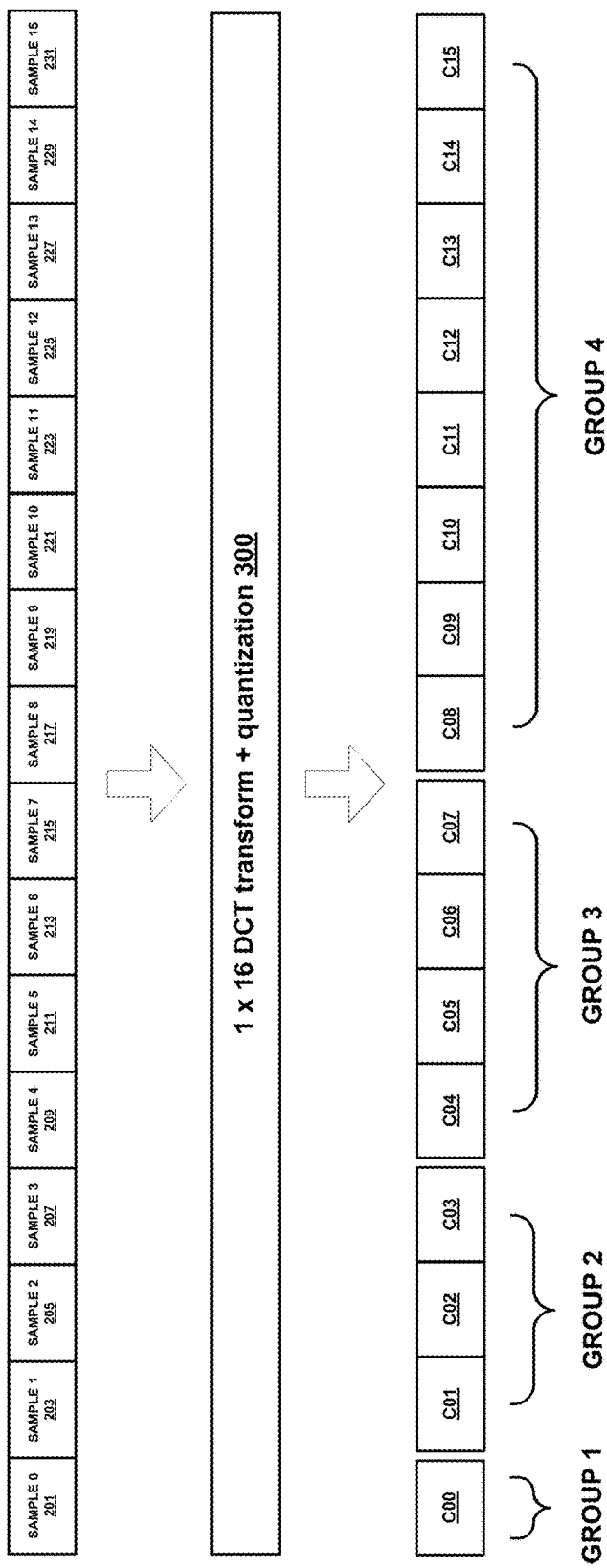
FIGS. 4-7 are diagrams illustrating methods of partitioning a block for a transform coefficient coding mode in accordance with aspects described in this disclosure.

FIGS. 4-7 are diagrams illustrating example techniques for partitioning a block for a transform coefficient coding mode in accordance with aspects described in this disclosure. In the example of FIG. 4, the block includes sixteen samples 201 to 231, where each sample is, for example, an intra prediction residual or a block prediction residual. A transformation can be applied to the samples 201 to 231 to obtain a plurality of transform coefficients C00 to C15. In one implementation, each component of the quantized transform coefficients in the block may, for example, be entropy coded according to the steps below. Although the diagrams illustrated in FIGS. 4-7 are generally described in terms of partitioning a block for a transform coding mode, the reverse procedure may also be performed in decoding the illustrated groups of transform coefficients.

The quantized transform coefficients in the block of a single component may be partitioned into N groups. In one example, N is 4 resulting in a block size of 1×16. The block may be transformed using a single 1×16 DCT-transform (element 300 of FIG. 4) or the block may be transformed using different transform size(s) such as, for example, a 1×8 DCT-transform or a 1×4 DCT-transform (see FIGS. 5-7). In each of these implementations, the construction of N=4 groups is illustrated below. However, in other embodiments, the number of groups N may be selected to be any suitable partitioning of the transform coefficients.

It is noted that the sixteen samples 201 to 231 in FIG. 4 may represent intra prediction residuals or block prediction residuals.

An embodiment of the partitioning of a block for a transform coefficient coding mode in accordance with aspects described in this disclosure is shown in FIG. 4. In the example of FIG. 4, four groups are constructed from the sixteen block samples 201 to 231, which are transformed using 1×16 DCT transform 300. In some implementations, the transform applied to the samples may be any suitable transform such as a Hadamard transform.

As shown in FIG. 4, the DCT transform generates a plurality of transform coefficients C00 to C15. In some implementations, the transform coefficients are ordered starting from the direct current (DC) coefficient, C00, which is the zero-frequency coefficient, to the highest frequency coefficient, C15. As shown in FIG. 4, the transform coefficients are partitioned, or grouped, into four groups. As used herein, the terms "partitioning" and "grouping" generally refer to a process of associating samples or transform coefficients together into groups and does not necessarily include physically separating the samples or transform coefficients. Unless stated otherwise, in the present disclosure, similar ordering may be used to represent the transform coefficients, where the first coefficient in group 1 represents the DC value, the last transform coefficient among the plurality of transform coefficients is associated with the highest frequency component, and the remaining transform coefficients are ordered from low to high (with respect to the associated frequency components) between the DC value and the highest frequency component. In the example of FIG. 4, group 1 includes the transform coefficient C00, group 2 includes the transform coefficients C01 to C03, group 3 includes the transform coefficients C04 to C07, and group 4 includes the transform coefficients C08 to C15. As such, frequency transform coefficients that are associated with frequency components that are "close" in value may be grouped together. For example, each group can be defined by including the transform coefficients that are representative of frequency components that fall within a frequency range associated with the corresponding group. The selection of which frequency components are grouped together (i.e., which transform coefficients are grouped together) may be selected based on various criteria, such as testing to determine the groupings that result in a higher efficiency coding.

Figure 5:
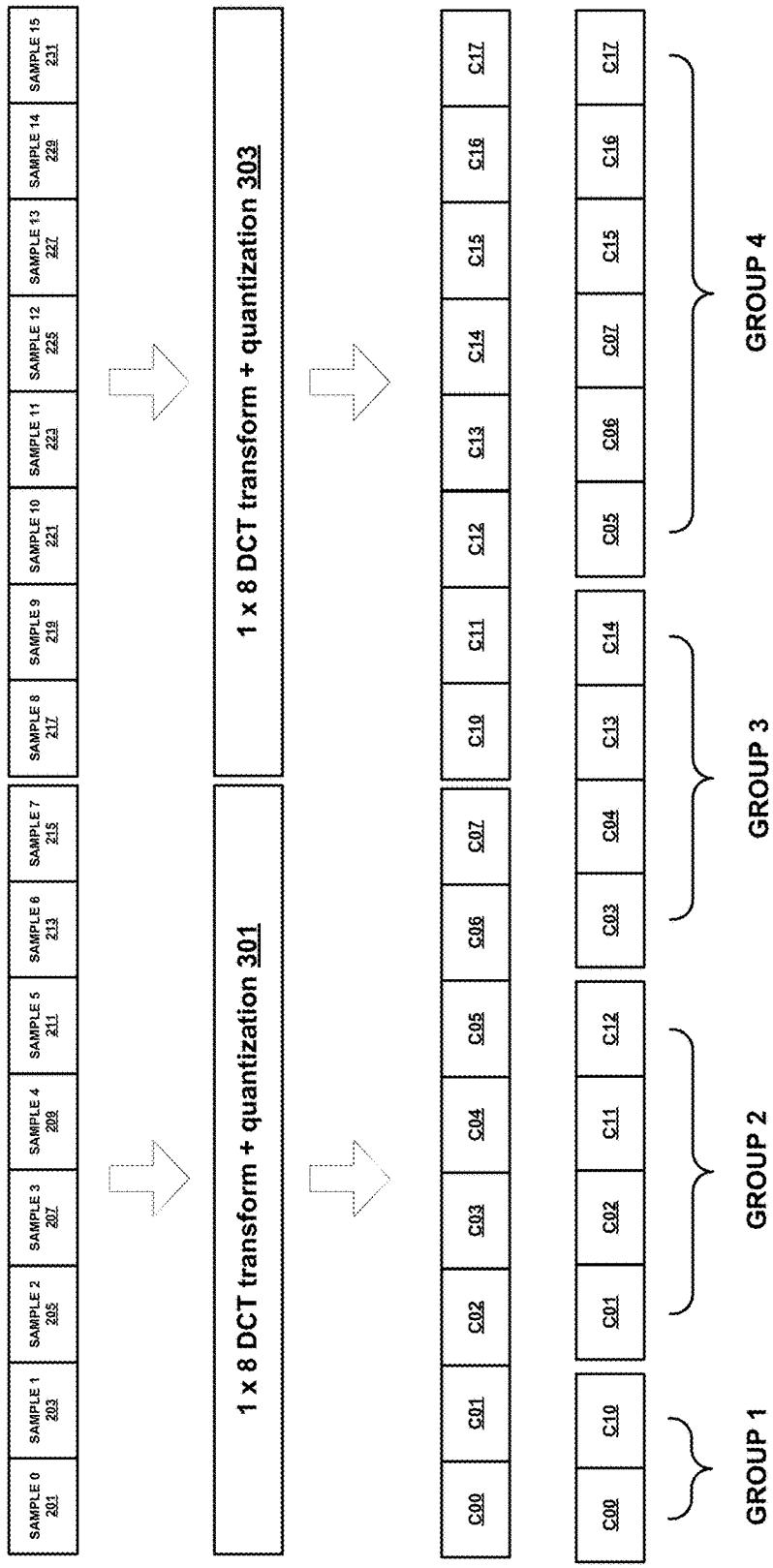

FIG. 5 is a diagram illustrating a partitioning (or grouping) of transform coefficients according to another example. In the example of FIG. 5, two 1×8 DCT transforms 301 and 303 are applied to the block samples 201 to 231. However, as discussed above, other types of transforms may be applied without departing from the aspects of this disclosure.

The first 1×8 DCT transform 301 generates a first plurality of transform coefficients C00 to C07 and the second 1×8 DCT transform 303 generates a second plurality of transform coefficients C10 to C17. The corresponding transform coefficients, in positional order, resulting from each 1×8 DCT transform may be associated with the same frequency component. For example, the transform coefficients C00 and C10 may both be DC coefficients and the transform coefficients C07 and C17 may be associated with the highest frequency components. In the example of FIG. 5, group 1 includes the transform coefficients C00 and C10, group 2 includes the transform coefficients C01, C02, C11, and C12, group 3 includes the transform coefficients C03, C04, C13 and C14, and group 4 includes the transform coefficients C05 to C07 and C15 to C17.

Figure 6:
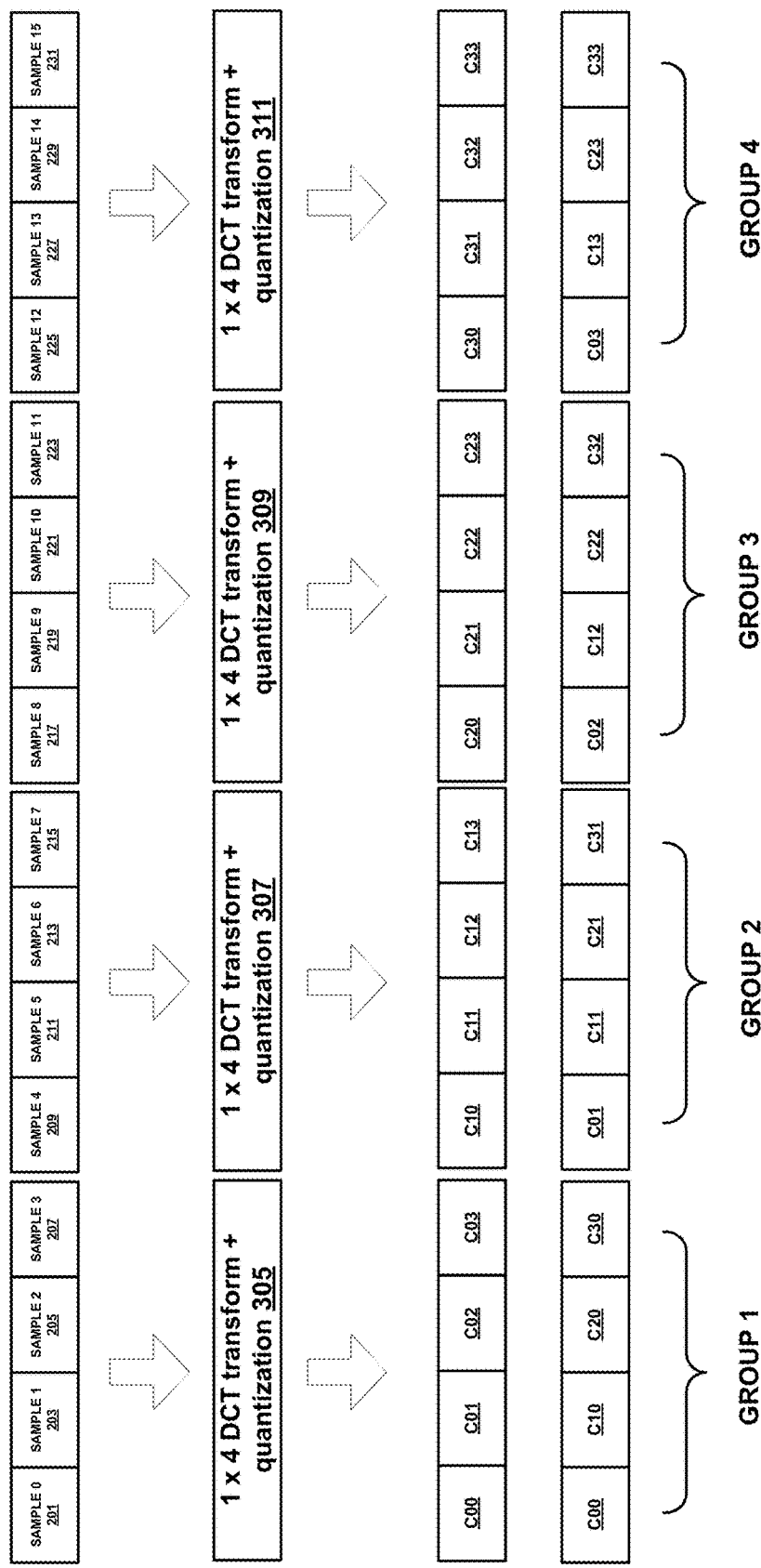

FIG. 6 is a diagram illustrating a partitioning of transform coefficients according to another example. In the example of FIG. 6, four 1×4 DCT transforms 305 to 311 are applied to the block samples 201 to 231. However, as discussed above, other types of transforms may be applied without departing from the aspects of this disclosure.

The first 1×4 DCT transform 305 generates a first plurality of transform coefficients C00 to C03, the second 1×4 DCT transform 307 generates a second plurality of transform coefficients C10 to C13, the third 1×4 DCT transform 309 generates a third plurality of transform coefficients C20 to C23, and the fourth 1×4 DCT transform 311 generates a fourth plurality of transform coefficients C30 to C33. The corresponding transform coefficients from each 1×4 DCT transform 305 to 311 can be associated with the same frequencies. For example, the transform coefficients C00, C10, C20, and C30 may be DC coefficients and the transform coefficients C03, C13, C23, and C33 may be associated with the highest frequency coefficients. In the example of FIG. 6, group 1 includes the transform coefficients C00, C10, C20, and C30, group 2 includes the transform coefficients C01, C11, C21, and C31, group 3 includes the transform coefficients C02, C12, C22, and C32, and group 4 includes the transform coefficients C03, C13, C23, and C33.

Figure 7:
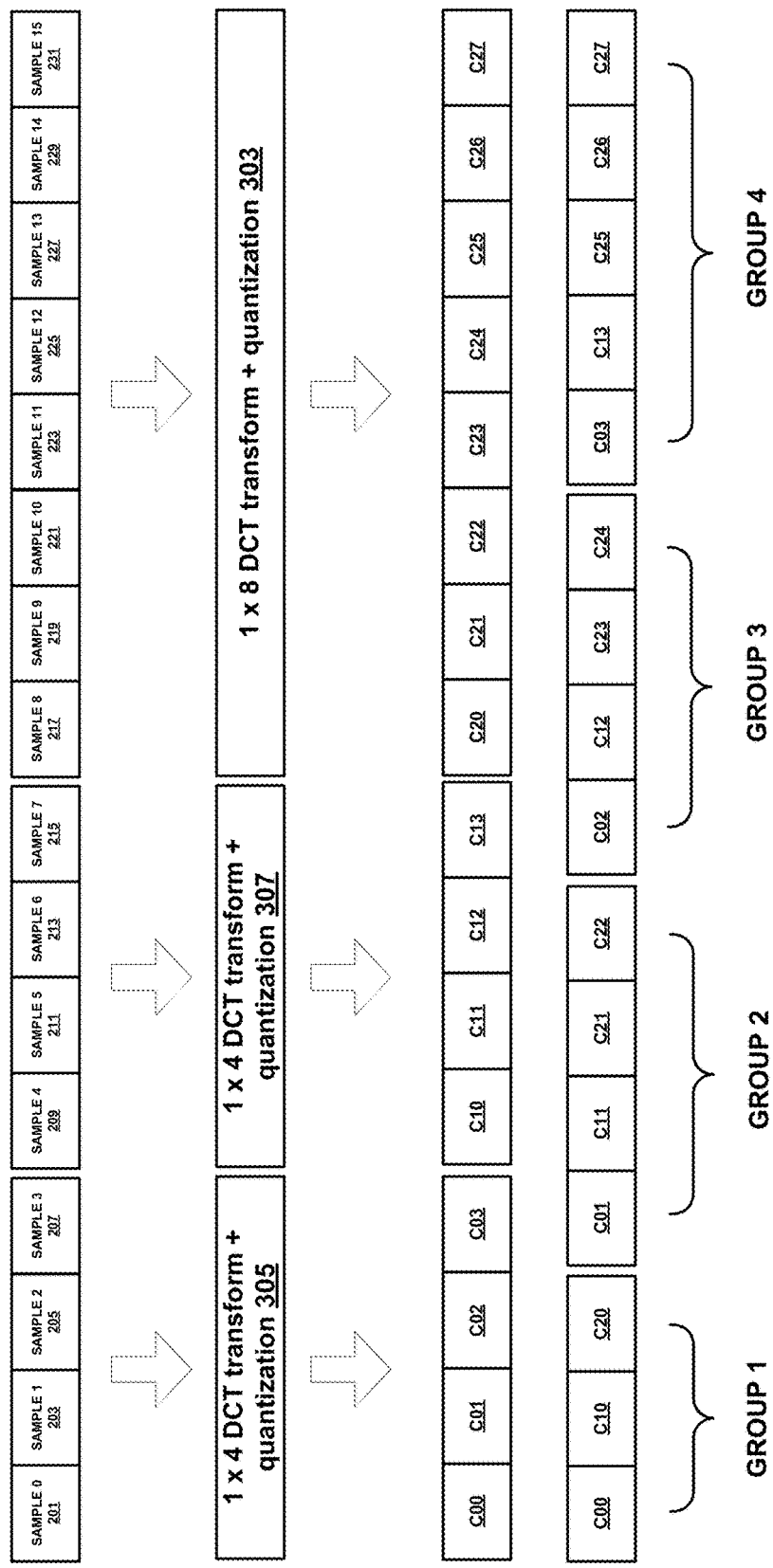

FIG. 7 is a diagram illustrating a partitioning or grouping of transform coefficients according to another example. In the example of FIG. 7, two 1×4 DCT transforms 305 and 307, as well as one 1×8 DCT transform 303, are applied to the block samples 201 to 231. However, as discussed above, other types of transforms may be applied without departing from the aspects of this disclosure.

The first 1×4 DCT transform 305 generates a first plurality of transform coefficients C00 to C03, the second 1×4 DCT transform 307 generates a second plurality of transform coefficients C10 to C13, and the 1×8 DCT transform 303 generates a third plurality of transform coefficients C20 to C27. The corresponding transform coefficients from each DCT transform 305 to 307 may have the same or similar frequencies. For example, the transform coefficients C00, C10, and C20 may be DC coefficients. In the example of FIG. 7, group 1 includes the transform coefficients C00, C10, and C20, group 2 includes the transform coefficients C01, C11, C21, and C22, group 3 includes the transform coefficients C02, C12, C23, and C24, and group 4 includes the transform coefficients C03, C13, C25, C26, and C27.

Although certain examples have been described in connection with FIGS. 5-7, other transforms and partitioning of the transform coefficients can also be implemented. For example, 1×8, 1×4, and 1×4 transforms may be applied in order, such as, [8 4 4], or 1×4, 1×8, and 1×4 transforms may be applied in order, such as, [4 8 4]. Further, the groups may be constructed using a methodology similar to the example of FIG. 7.

In other implementations, linear grouping methods may be used to construct the four groups, where each group can have 4 transform coefficients per group. For example, in an alternative to the example of FIG. 4, after the application of the 1×16 DCT transform 200, group 1 may contain the first four transform coefficients C0 to C3, group 2 may contain next four transform coefficients C4 to C7, etc. In an alternative to the example of FIG. 5, after the application of the 1×8 DCT transforms 301 and 303, each group may be constructed by taking two coefficients from each set of transform coefficients C00 to C07 and C10 to C17. For example, group 1 may contain C00, C10, C01, and C11, group 2 may contain C02, C03, C12, and C13, etc. In an alternative to the example of FIG. 7, after the application of the 1×4 DCT transforms 305 and 307, as well as the 1×8 DCT transform 303, each group may be constructed by taking one coefficient each from the two sets of transform coefficients C00 to C03 and C10 to C13 and 2 coefficients from the set of transform coefficients C20 to C27. For example, group 1 may contain C00, C10, C20, and C21, group 2 may contain C01, C11, C22, and C23, etc. Similar grouping strategies may be implemented to construct groups of other partitioning transform choices, such as, for example, [8 4 4], [4 8 4], etc.

While a number of grouping techniques for encoding have been described in connection with FIGS. 4-7, the decoding of the groups may be performed in the reverse order of the encoding techniques described with reference to FIGS. 4-7. For example, the groups of transform coefficients may be reorganized based on the number of transforms applied to the samples 201 to 231 and the same number of inverse transforms may be applied to the reorganized transform coefficients. The reorganization may be based on, for example, the number of transform coefficients in each group or a signaling of the type and number of transforms applied to generate the transform coefficients.

In some implementations, after the grouping construction, the index of the group that contains at least one non-zero value may be found in the reverse scan order, for example, the search progresses through groups 4, 3, 2, and 1, in order. The index of the group that contains at least one non-zero value (which may also be referred to as a "significant" group) may be signaled to the decoder. In one example, the index may be signaled using a 2-bit fixed length code. In another example, variable length codes (VLCs), such as Huffman or structured VLC codes such as Exponential Golomb or Rice codes may be used.

The remaining groups (including the group that has one non-zero value) may be coded using DSU-VLC using prefix and suffix parts, where the prefix indicates the size of the suffix that follows. In the suffix part, the coefficients in the groups may, for example, be coded using the same number of bits.

In another approach, alternative or in addition to approaches to the above, the groups may be coded using group-wise skip mode, where a skip flag or skip value is signaled for each group, and each group is DSU-VLC coded only if the group has at least one non-zero value.

In yet another approach, a combination of one or more of the above approaches may be combined with a block-wise skip mode, where the techniques explained above may be applied only if at least one of the sixteen coefficients C00 to C15 contains a non-zero value.

In one example, block-wise skip mode is not applied to all the three color coordinates. In another example, block-wise skip mode is applied only to the chroma color coordinates but not to the luma color coordinate.

In still another approach, before applying the steps above, the last significant transform coefficient position (e.g., the position where the absolute value of the transform coefficient is greater than or equal to 1) is identified first. The position information may be explicitly signaled to the decoder. Furthermore, the absolute value of the last significant position may be subtracted by 1. For example, let C represent the magnitude of the coefficient value corresponding to the last significant position. The coefficient may be replaced by $C_{new}=(|C|-1)*sign(C)$, where sign(C) represents the sign value of coefficient C. The sign information sign(C) corresponding to the last significant position may be signaled. Then, all the samples, starting from the first coefficient to the last significant coefficient position (inclusive) may be coded using group-wise skip mode. Thereafter, if at least one of the samples within the group is non-zero, then the group may be DSU-VLC coded. If none of the samples within the group is non-zero, then the group may be coded using group-wise skip mode. It is noted that when the last significant coefficient position does not overlap with the group boundary, only the subset of samples within the group until the last significant coefficient position are coded, whereas the remaining samples (having a value of zero) are not coded. At decoder, the remaining samples (having a value of zero) may be inferred directly from the last significant coefficient position.

In one example, the sign information corresponding to the last significant position may be signaled only when the absolute value of the last significant coefficient value subtracted by 1 is equal to zero, i.e., $|C|-1==0$, where C represents the magnitude of the coefficient value corresponding to the last significant position. The coefficients may be coded using 2's complement, for example, N-bits can be used to represent the values in $-(2^{N-1})$ to $+(2^{N-1}-1)$.

In one aspect, the last significant position may be coded using a fixed length code, where the number of bits is set equal to log 2(numberOfSamplesInBlock).

In another aspect, the last significant position may be coded using variable length codes, such as, for example, Exp-Golomb code, Huffman code, a mixture of Rice and Exp-Golomb codes, etc. In yet another aspect, block-wise skip mode described above may be applied before applying the techniques of using variable length codes to code the last significant position.

In yet another approach, block-wise skip mode is not applied before applying the technique of using variable length codes to code the last significant position. In scenarios when all the samples in the block are zero, a default value of last significant position may be signaled to the decoder.

In one example, the default last significant position is zero that represents the first sample position in group 1. After signaling the default last significant position (of zero), if all the samples in the block are zero, group 1 may be coded using group-wise skip mode. On the other hand, if the value at the default last significant position is non-zero, then the first sample in group 1 may be coded using DSU-VLC coding principles.

In another example, the absolute value corresponding to the default last significant position is not subtracted by 1. As the coefficient value is not subtracted by 1, the sign information corresponding to the default last significant position is not signaled.

In yet another example, the absolute value corresponding to the default last significant position may be subtracted by 1. There may be, for example, two cases: (i) there is a non-zero value at the default last significant position; and (ii) the value at default position is zero. As the last significant coefficient value is subtracted by 1, the sign information corresponding to the default last significant position may be signaled when $|C|-1==0$, where C represents the magnitude of the coefficient value corresponding to the last significant position.

It is noted that in scenarios where the last significant position is not the same as the default position (zero), the technique(s) of using variable length codes to code the last significant position may be applied.

Prefix Prediction

In one implementation, the prefix values of each component may be predicted as described below.

The values prevBits and currBits, may represent the number of bits required to code the previous group and the current group, respectively (e.g., the prefix value of previous group and the prefix value of the current group, respectively). The values prevQP and currQP may represent the quantization parameter used to code the previous group (is the previous group not being coded in skip mode) and the current group, respectively.

The value prevBits may be adjusted (denoted here as the value adjPrevBits) based on the difference between the values currQP and prevQP, as follows:

$$delSize=|curQp-prevQp|>>k$$

$$delSize=(curQp>prevQp)?-delSize:delSize$$

$$adjPrevBits=prevBits+delSize$$

$$adjPrevBits=Max(1,adjPrevBits)$$

Here, k may be any positive integer. In one example, k is equal to 3.

In another example, the value prevBits is not adjusted based on the difference between the values currQP and prevQP, i.e., the value prevBits is used for prefix prediction without any adjustment.

While coding the transform coefficients, the current group prefix value (for example, the value currBits) may be predicted based on the prefix value of the same group index (and same component) of a block that is previously coded using transform mode. That is, the value currBits from group i, i∈{1, 2, 3, 4} may be predicted based on the prefix value (and the respective quantization parameter) of the respective group i, i∈{1, 2, 3, 4} in the previously coded transform block. If the respective color component in the previous block is coded using block-wise skip mode, then the last occurrence of transform block with same color component that is not coded using block-wise skip mode can be considered for prediction. If a particular group i in the previous block is coded in group-wise skip mode, then the value prevBits=1 and/or the value adjPrevBits=1 may be used.

In prefix prediction, the prefix value of the previous block that is coded using the same mode as of the current block can be used. In one example, if the current block directly codes the residuals without using the transform, then the prefix value and quantization parameter of the previous block that is not coded using transform (neither using block-wise mode) may be considered for prediction. In particular, among the four prefix values one for each group with in the block, the prefix value corresponding to the last occurrence of the group that is not coded using group-wise skip mode can be used for prediction.

In another example, a separate prefix prediction function can be maintained for each coding mode, for example, if the current block is coded after applying a transform, then the prefix value associated with the previous occurrence of a block that is coded with the transform is used for prediction. In a similar manner, if the current block residuals represent residuals generated from block-prediction, then the prefix value associated with the previous occurrence of a block that contains block-prediction residuals is used.

In yet another example, prefix prediction function can be shared across the modes, in such a way that one function is maintained for the blocks coded with transform and another function may be maintained for the blocks that represents the residuals, for example, 1D prediction residuals, and/or block-prediction residuals, and/or intra-prediction residuals, and/or 2D median adaptive predicted residuals.

In still another example, the prefix values of all the groups in the current block may be predicted based on a single prefix value in the previously coded block. The single prefix value may be associated with any of 4 groups. In one approach, the single prefix value may be associated with the last group, e.g., i=4 in the previous block. If the last group in the previous block is coded using group-wise skip mode, then the prefix value associated with a group i−1 that is not coded using group-wise skip mode is used. In another approach, if the last group or any particular group is coded using group-wise skip mode, prevBits=1 and/or adjPrevBits=1 is used.

In scenarios where a previous block with the same coding mode as of the current block could not be identified, the prediction may be based on the default value of the value prevBits=1 and/or the value adjPrevBits=1, together with the quantization parameter set equal to the default initial value of the encoder.

Prefix Coding

In one implementation of prefix coding, for each component, the absolute difference between the value currBits and the value adjPrevBits may be coded using unary coding and the sign may be indicted by an additional 1-bit. It is noted that the sign bit may, for example, be signalled only when the absolute difference is strictly greater than zero.

In another implementation, for each component, the absolute difference between the value currBits and the value prevBits can be coded using unary coding and the sign may be indicated by an additional 1-bit.

In yet another implementation, for each component, the value currBits may be coded using unary codes without any prediction.

In still another implementation, for each component, the value currBits−1 may be coded using unary codes without any prediction.

In another implementation, instead of directly coding the prefix value (for example, the value currBits−1), the prefix value may be mapped to a value (for example, using a mapping function or table) and the mapped value may be coded. The table/function may be designed in a way that the average expected code length is small (for example, less than a defined code length value). The coding of the prefix value may be done by sorting a prefix value (for example, the value currBits−1) in descending order and assigning a specific value such that the most probable prefix values are mapped to a value whose code length is small and the least probable prefix values are mapped to a value whose code length is large (for example, equal to or greater than a defined code length value).

In yet another implementation, instead of unary codes, VLCs, such as, for example, Huffman or structured VLC codes such as Exponential Golomb, Rice codes, may be used.

In still another implementation, fixed length codes can be used for prefix coding.

Extensions to 2D Blocks

In this subsection, the extension of the entropy coding to 2D block sizes P×Q is disclosed, wherein P and Q respectively represent the block height and block width.

Regarding the coding of quantized block residuals, quantized block residuals in general refer to the residuals generated by subtracting a predicted block from an original block and applying quantization on top of the residual block. The prediction can be carried out from the spatially neighboring samples. Examples of spatial prediction include block prediction, median adaptive prediction (MAP), intra prediction, and/or midpoint prediction. It is noted that a transform is not applied for the coding of quantized block residuals.

Each component of the quantized block residuals of the 2D block P×Q may be partitioned into N groups, where N is a positive integer. In one example, N is set to 4.

The groups can be formed such that each quantized residual sample belongs to one and only one group.

The number of samples in each group may be equal, for example, each group may have (P×Q)/N samples. The groups may be constructed by partitioning the block P×Q into (P×Q)/N partitions and the samples in each partition can be considered as one group. In one example, the partitioning can be carried out only in the vertical direction, for example, each partition size is P×(Q/N). In another example, the partitioning can be done only in the horizontal direction, wherein each partition size (P/N)×Q. In another example, the partitioning can be done in both vertical and horizontal directions. As an example, each partition size can be (P/(N/2))×(Q/(N/2)).

In another example, the number of samples in each group is not equal, wherein partitioning into sub blocks may be carried out in non-uniform fashion.

After constructing the groups, the groups can be coded using the technique(s) described above in the section regarding "Coding of Quantized Block Residuals".

Regarding the coding of quantized transform coefficients, each component of the quantized transform coefficients of the 2D block of size P×Q may be partitioned into N groups, where N is a positive integer. In one example, N is set to 4.

The groups may be formed such that each quantized coefficient sample belongs to only one group.

The number of samples in each group may be unequal. The quantized transform coefficients that represent similar frequencies may form one group.

FIG. 8 is a diagram illustrating another example technique for partitioning a block for a transform coefficient coding mode, in accordance with aspects of this disclosure. FIG. 8 illustrates an example of partitioning a 2D block of samples into groups when the block size is 4×4. In FIG. 8, P=4 and Q=4 and the number of groups N=4. For example, a first shading represents to a first group that includes the transform coefficient C00. A second shading represents a second group that includes C01, C02, C04, and C08. A third shading represents a third group that includes C05, C06, C09, and C10. A fourth shading represents a fourth group that includes C03, C07, C11, C12, C13, C14, and C15.

It is noted that the grouping construction shown in FIG. 8 is merely an example which illustrates aspects of the techniques described herein, and there are numerous other ways to construct groups for a given block of size P×Q.

In another approach, the coefficients may be scanned in a particular scan order, and the resulting 1D coefficient scan can be partitioned into N groups. For example, the scanning may be performed in zig-zag order. In another example, vertical and/or horizontal scan order(s) may be used.

When transform partitioning is applied (for example, a transform is applied for each sub-block within the block), the transform coefficients that represent similar frequencies across different partitions may be included in the same group. For example, the DC value corresponding to the different partitions within the block may be considered for forming a first group.

In another approach, the number of samples in each group may be equal and the groups may be constructed using the technique(s) described above the section regarding "Coding of Quantized Block Residuals".

After constructing the groups, the groups may be coded using the technique(s) described above in the section with the heading "Coding of Transform Coefficients".

An implementation of a technique is described below for constructing groups according to another exemplary approach.

For illustrative purposes, the block size may be P×Q with P=2 and Q=8, and the number of groups N=4. Here, P, Q, and N may be defined as described above.

Figure 9:
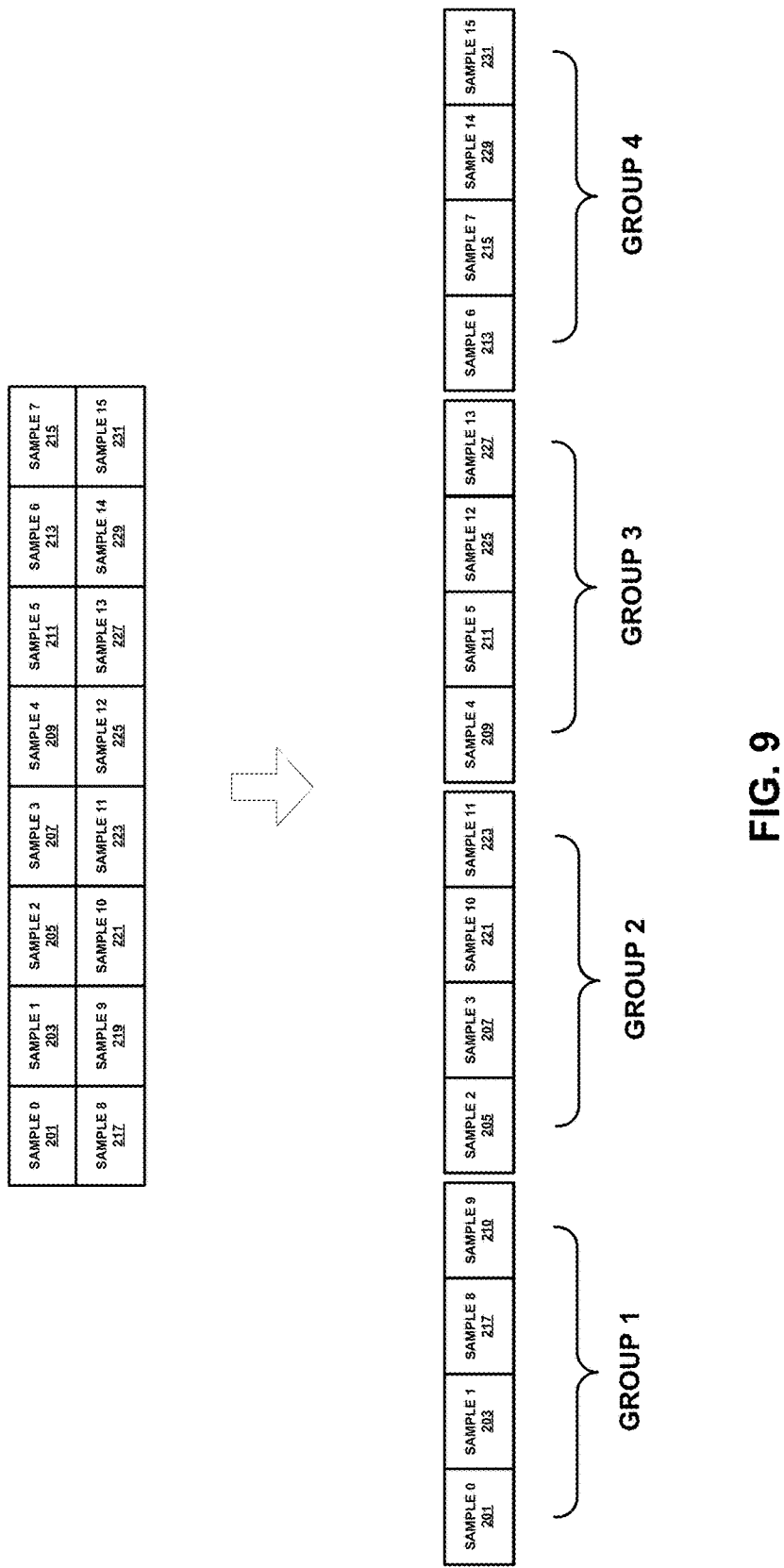
FIG. 9-11 are diagrams illustrating methods of partitioning a block in accordance with aspects described in this disclosure.
Figure 10:
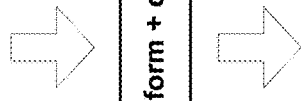
Figure 10:
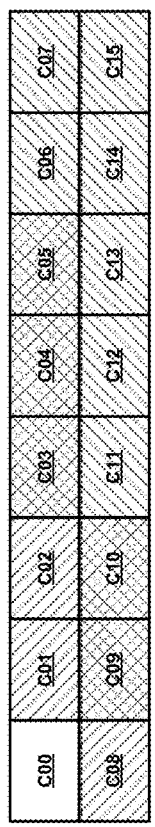
Figure 10:
Figure 10:
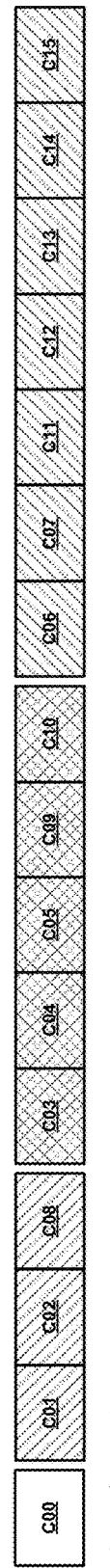
Figure 11:
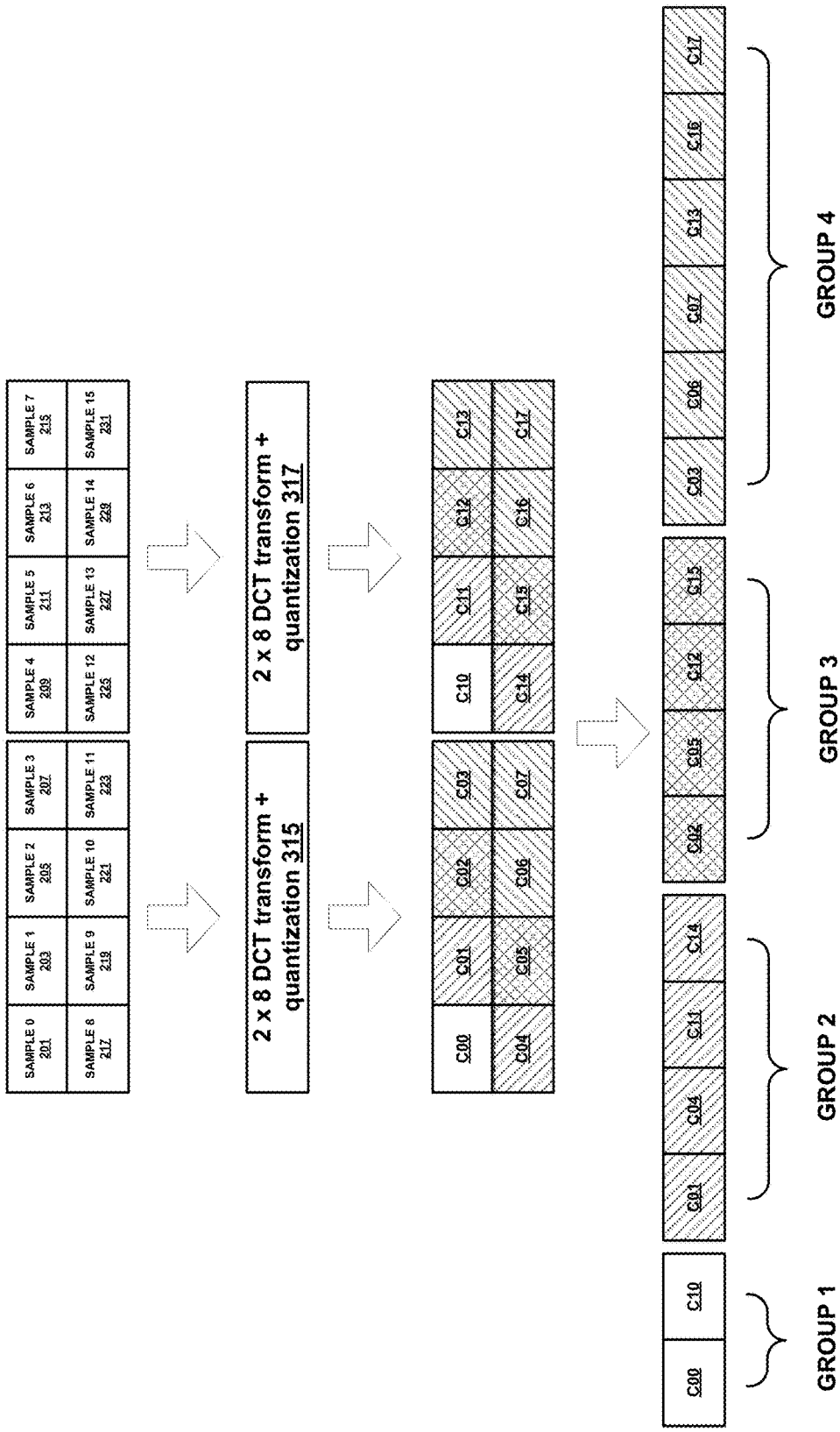

FIGS. 9-11 are diagrams illustrating methods of partitioning a block in accordance with aspects described in this disclosure.

As described in the section above with the heading "Coding of Quantized Block Residuals", the grouping of quantized block residuals may be done via partitioning the blocks vertically, where each sub-block size of 2×2 is considered as one group as shown in FIG. 9. It is noted that a transform is not applied in this embodiment.

As described in the section above with the heading "Coding of Quantized Transform Coefficients", the grouping of quantized transform coefficients of a block of size 2×8 may be constructed as shown in FIG. 10. In the example of FIG. 10, a 2×8 transform 313 is applied.

When transform partitioning is applied (e.g., when two 2×4 transforms 315 and 317 are applied for a block size of 2×8), groups may be constructed as shown in FIG. 11.

Entropy Coding for DSC of Non-4:4:4 Chroma Sub-Sampling Image Formats

In accordance with one or more aspects of the present disclosure, described herein is an extension of high throughput entropy coding techniques for non-4:4:4 chroma sub-sampling image formats. For example, the techniques disclosed herein may be applicable to 4:2:2 and 4:2:0 chroma sub-sampling image formats.

In order to achieve high throughput (e.g., 4 pixels/clock), for 4:2:2 image formats, N and N/2 groups may be generated for luma and chroma components, respectively. For 4:2:0 image formats, N and N/4 groups may be generated for luma and chroma components, respectively. It is noted that in 4:2:2 and 4:2:0 image formats, the luma component may be handled as previously described above. Described below are modifications and/or additional steps for handling the chroma components of non-4:4:4 chroma sub-sampling image formats (e.g., 4:2:0 and 4:2:2).

In one example, when the block size is 2×8 and the number of groups N=4, for the luma component, the respective number of groups in chroma components may be two for the 4:2:2 image format, and one for the 4:2:0 image format.

Coding of Quantized Transform Coefficients for Non-4:4:4 Chroma Image Formats

When a current block is coded based on a transform mode (e.g., DCT or Hadamard), for 4:2:2 and 4:2:0 image formats (or other non-4:4:4 image formats), the number of samples in each group may not be same for chroma components. It is noted that, in other embodiments, for 4:2:2 and 4:2:0 image formats, the number of samples in each group may be same for chroma components but not for luma components.

FIG. 12A illustrates an example technique for grouping samples of chroma components for the 4:2:2 image format (for an example block size of 2×8). As shown in FIG. 12A, for the 4:2:2 image format, a block size of 2×8 and a number of groups N=4, there may be two groups of chroma component coefficients (N/2=2) wherein similar frequency bands may be collected in one of the two groups. Although FIG. 12A illustrates the coefficients C00 through C007 as being partitioned into two groups with C00 being in the first group and the remainder of the coefficients in the second group, it is understood that the coefficients may be partitioned into different groups in other embodiments. For example, in some embodiments, the first group may comprise the coefficients C00 and C01 with the remainder of the coefficients in the second group.

In some embodiments, different transform scanning orders may be used when performing the grouping. For example, a horizontal scanning order may be used that outputs the coefficients in the order of C00, C01, C02, C03, C04, C05, C06, C07, etc. In another example, a zig-zag scanning order may be used that outputs the order of coefficients as C00, C04, C01, C02, C05, C06, C03, C07, or as C00, C01, C04, C05, C02, C03, C06, C07. In another example, a vertical scanning order may be used that outputs the coefficients in the order of C00, C04, C01, C05, C02, C06, C03, C07. In some embodiments, how the coefficients are partitioned into groups may be based upon the transform scanning order used. For example, in embodiments where zig-zag scanning order is used, the first group may comprise coefficients C00 and C04, with the remaining coefficients partitioned into the second group. In another embodiment, the first group may comprise coefficients C00, C04, C01, and C02, with the second group comprising the remaining coefficients.

FIG. 12B illustrates an example technique for grouping samples of chroma components for the 4:2:0 image format (for an example block size of 2×8). As shown in FIG. 12B, for the 4:2:0 image format, the number of groups may be one (N/4=1), wherein all four coefficients (including the DC coefficient, C00) are collected into the same group, even if not all of the coefficients have similar frequency bands. Once the entropy coding groups are constructed, the chroma components may be coded using the entropy coding techniques described above.

Coding of Quantized Block Residuals for Non-4:4:4 Chroma Image Formats

When a current block is coded without using a transform, such as, for example, based on block-prediction mode, DPCM mode, or transform skip mode, for 4:2:2 and 4:2:0 image formats (or other non-4:4:4 image formats), the number of samples in each group may be same for chroma components.

FIG. 13A illustrates an example technique for grouping samples of chroma components for the 4:2:2 image format (for an example block size of 2×8). FIG. 13B illustrates an example technique for grouping samples of chroma components for the 4:2:0 image format (for an example block size of 2×8). For example, the first group may comprise samples {S0, S1, S2, S3}, while the second group comprises samples {S4, S5, S6, S7}. For the 4:2:2 image format, other grouping techniques may be applied. For example, samples {S0, S1, S4, S5} may form one group and samples {S2, S3, S6, S7} may form a second group. Once the entropy coding groups are formed, the chroma components may be coded using the entropy coding techniques described above.

Process Flow

Figure 14:
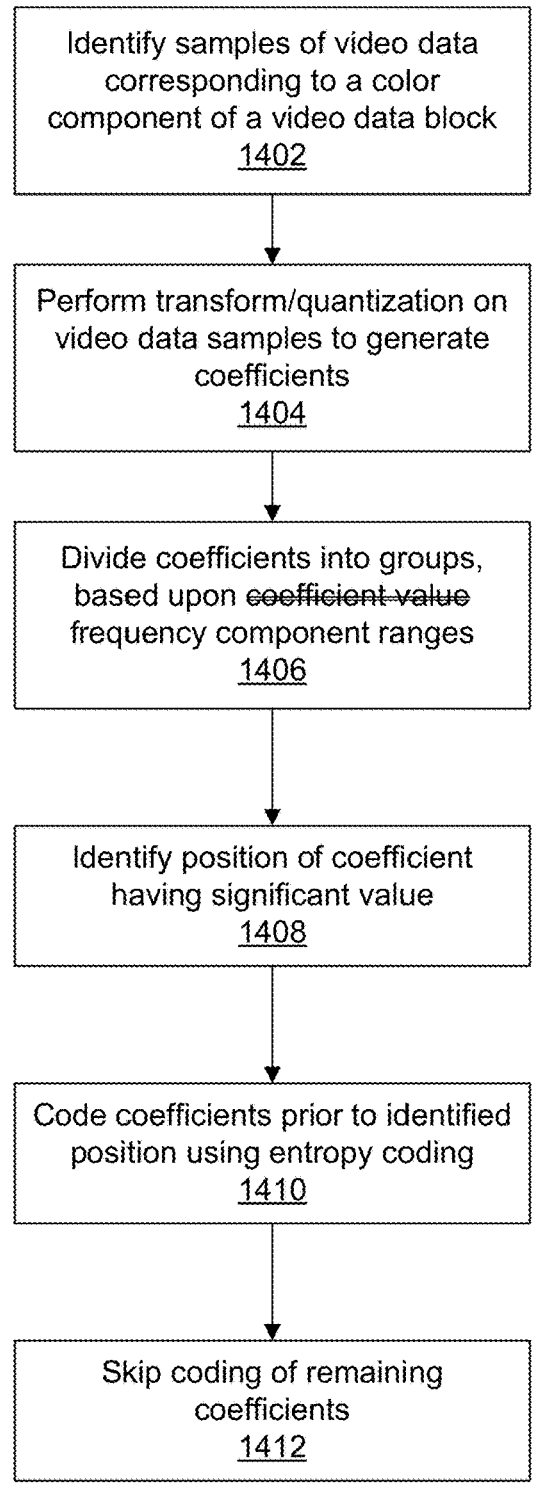
FIG. 14 illustrates a flowchart of an example process for encoding a block of video data using the techniques described herein, in accordance with some embodiments.

FIG. 14 illustrates a flowchart of an example process for encoding a block of video data using the transform mode (e.g., DCT, Hadamard, and/or the like), in accordance with some embodiments. At block 1402, the encoder identifies samples of video data corresponding to a color component of residual values of a block of video data.

At block 1404, an encoder performs a transform and quantization on the identified video data samples to generate a plurality of coefficients. The transform may comprise a DCT transform, Hadamard transform, or other type of transform. In some embodiments, the video data samples of the block may be transformed using a single transform (e.g., a 1×16 DCT-transform as illustrated in FIG. 4 or a 2×8 DCT-transform) or using multiple transformations of different transform sizes (e.g., two 1×8 DCT-transforms as illustrated in FIG. 5 or two 2×4 DCT-transforms). In some embodiments, each coefficient may correspond to a particular frequency component.

At block 1406, the encoder partitions the coefficients into a plurality of groups, based at least in part upon the position of the coefficients. In some embodiments, the coefficients are partitioned into groups of equal sizes, while in other embodiments, the coefficients may be partitioned into groups of different sizes. In some embodiments, the coefficients may be partitioned by ordering the coefficients by a one or more frequency component ranges (e.g., a first coefficient representing the DC value, the last coefficient representing associated with the highest frequency component, and the remaining coefficients ordered from low to high with respect to the associated frequency components). In some embodiments, the transform coefficient may be ordered based on a particular scanning methods, e.g., horizontal, vertical, zig-zag etc. and are further partitioned into groups. In some embodiments, the number of groups that the coefficients are partitioned in may be based upon a chroma sub-sampling image format associated with the video data. For example, a block of the video data may be coded using a 4:4:4, 4:2:2, or 4:2:0 image format. The number of groups for each component may be based upon a block size, the chroma sub-sampling image format, transform sizes, and whether the samples are luma or chroma samples.

At block 1408, the encoder identifies a position of a last significant coefficient of the plurality of coefficients. In some embodiments, the coefficient may correspond to a last coefficient having an absolute value greater than or equal to a predetermined value (e.g., 1). The position of the identified coefficient may be signaled in the bitstream (e.g., to be received by the decoder). Because the values of the coefficients resulting from the transform may exhibit decaying values (e.g., exponential decay), once the last significant coefficient is identified, all remaining coefficients after the last significant coefficient may have a value of 0. In some embodiments, the last significant coefficient may be identified by starting from the last coefficient of the block and checking the value of each coefficient in backwards order until the last significant coefficient is found.

In some embodiments, in order to reduce a number of bits needed to code the significant coefficients of the plurality of coefficients, the encoder may subtract the absolute value of the last significant coefficient by 1. In addition, if the last significant coefficient has an absolute value of 1, a sign value of the identified coefficient may also be signaled in the bitstream, allowing for the decoder to determine the sign of the last significant coefficient.

At block 1410, the coefficients from the first coefficient to the position of the identified significant coefficient may be coded by the encoder using entropy coding. For example, each group may be coded using a prefix and a number of suffixes, wherein the prefix indicates a size of each suffix of the group, and number of suffixes equal to the number of coefficients in the group. When the bitstream is decoded, a decoder may decode the prefix to determine the length of the suffixes, allowing for the positions of each suffix of the group to be determined. Because the positions of each of the suffixes of the group can be determined by decoding the prefix, the suffixes of the group can be decoded in parallel, potentially increasing throughput of the decoding process.

At block 1412, the remaining coefficients (e.g., coefficients having positions after that of the identified last significant coefficient) may be skipped by the encoder. When the decoder decodes the encoded video data, once the decoder determines the position of the last significant coefficient, it may assume that all subsequent coefficients of the block have a value of 0. As such, there is no need for the remaining coefficients to be coded.

Figure 15:
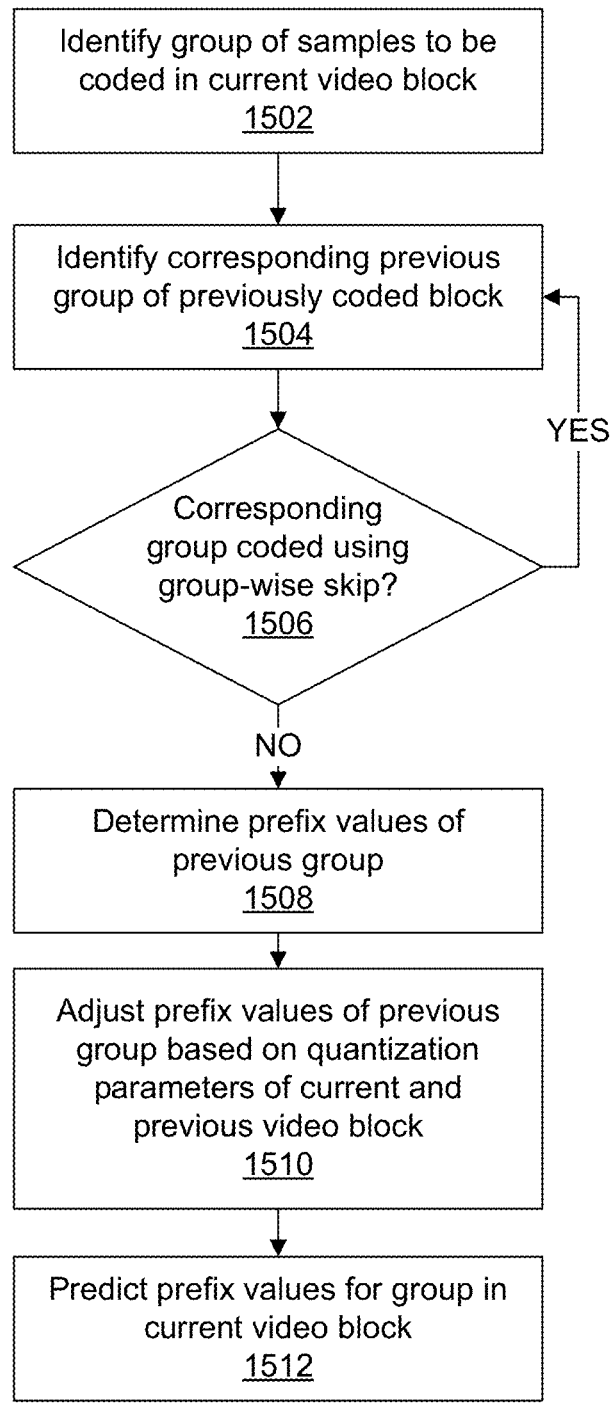
FIG. 15 illustrates a flowchart of an example method for prefix prediction, in accordance with some embodiments.

FIG. 15 illustrates a flowchart of an example method for prefix prediction, in accordance with some embodiments. At block 1502, the encoder identifies a group of samples or coefficients to be coded in a current video block. In some embodiments, the group of samples may correspond to color components of the video block to be coded using a non-transform coding mode. In some embodiments, the group of coefficients may correspond to samples that have been transformed as part of a transform coding mode. In some embodiments, the group may be associated with a group index which identifies which group of the block of video data the identified group corresponds to.

In some embodiments, the encoder may determine whether or not all components in the group have a predetermined value (e.g., zero value). If so, the group may be encoded using block-wise skip mode, with no need for performing prefix prediction.

At block 1504, the encoder may identify a corresponding group of a previously coded block of video data. In some embodiments, the corresponding group may correspond to a group of the previously coded video block having the same group index as the identified group.

In some embodiments, the previously coded block of video data may correspond to the block of video data that was coded directly before the current block in time. In some embodiments, the previously coded video block may correspond to the previous block of video data that was coded using the same mode as the current video block.

At block 1506, the encoder makes a determination as to whether the corresponding group of the previously coded block was coded using group-wise skip mode. If so, the process may return to block 1504, where another corresponding group of a previously coded block may be identified. On the other hand, if the corresponding group was not coded using group-wise skip, the process may proceed to block 1508, wherein the prefix value of the corresponding group are identified. The prefix value may correspond to the number of bits required to code the previous group.

At block 1510, the encoder may adjust the identified prefix value of the corresponding group. In some embodiments, the prefix value may be adjusted based at least in part upon a quantization parameter of the previously coded block and a quantization parameter of the current block. At block 1512, the prefix value for the identified group of the current video block may be predicted, based upon the (adjusted) prefix value of the corresponding group.

Figure 16:
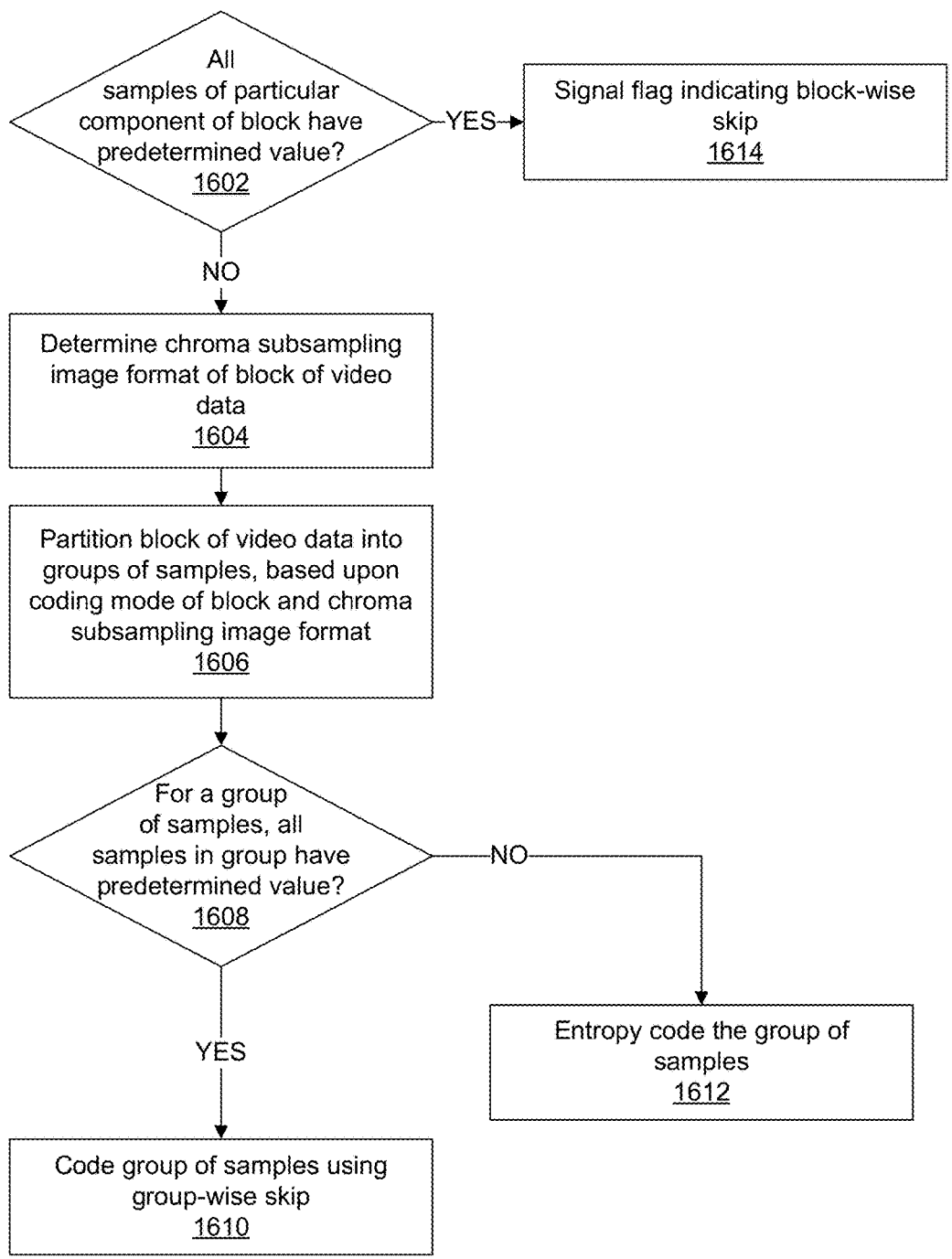
FIG. 16 illustrates a flowchart of an example method for entropy encoding a block of video data, in accordance with some embodiments.

FIG. 16 illustrates a flowchart of an example method for entropy encoding a block of video data, in accordance with some embodiments. At block 1602, the encoder receives video data corresponding to samples of quantized color component residual values of a block. In some embodiments where a transform coding mode is used, the samples of video data may correspond to transformed coefficient values of the color component residuals of a block. The encoder may determine whether all samples of the block have a predetermined value (e.g., 0). If so, the process may proceed to block 1614. At block 1614, the encoder signals a flag indicating that the samples for the block corresponding to the color component are to be coded using block-wise skip mode (also referred to as component skip mode).

In some embodiments, if the samples of video data correspond to the luma components of the block, then the determination whether to code the block using block-wise skip mode may be skipped. On the other hand, if the samples of video data correspond to chroma components of the block, then the determination may be performed.

If it is determined that the video data for the block is not to be coded using block-wise skip mode, the process may proceed to block 1604. At block 1604, the encoder determines a chroma subsampling image format of a block of video data. In some embodiments, the chroma subsampling image format may correspond to 4:4:4, 4:2:2, or 4:2:0.

At block 1606, the encoder partitions the block of video data into one or more groups of samples, based upon the coding mode of the block and the chroma subsampling image format. In some embodiments, the samples may correspond to color components of residual values of the block of video data. In embodiments where the samples correspond to chroma components, the number of samples per component, number of samples in each group, and/or the number of groups may be different depending upon the chroma subsampling image format associated with the block. For example, a block coded using the 4:2:2 image format may divide luma component samples into N groups, and chroma component samples into N/2 groups, while a block coded using the 4:2:0 image format may divide luma component samples into N groups, and chroma component samples into N/4 groups.

In some embodiments, where a transform coding mode is used, the group of samples may correspond to one or more coefficients determined by performing one or more transforms on color components of residual values of the block. The type of transform performed may be based upon a type of transform coding mode associated with the video block. In some embodiments where a transform coding mode is used, the encoder may identify and signal a last significant coefficient of the coefficients of the block (e.g., as described in relation to FIG. 15). In some embodiments, the encoder may also adjust a value of the last significant coefficient.

At block 1608, for a group of the one or more groups of samples, a determination is made as to whether all samples in the group have a predetermined value. In some embodiments, the predetermined value may be a zero value. In addition, in some embodiments, a determination may be made as to whether all samples in the block corresponding to a particular color component are of the predetermined value (e.g., 0). If so, all samples of the block of the particular component may be coded using a block-wise skip mode. In one example, the block-wise skip mode is applied only for chroma components and not for luminance component.

If it is determined that all samples in the group have the predetermined value, the process may proceed to block 1610, wherein the group of samples is coded using group-wise skip. In some embodiments, the encoder may set a value of a skip flag or skip value for the group.

On the other hand, if it is determined that not all samples in the group have the predetermined value, then at block 1612, the samples of the group may be entropy coded. In some embodiments, the group may be coded using one or more prefixes and one or more suffixes, wherein a prefix indicates a number of bits used to code a corresponding suffix.

Figure 17:
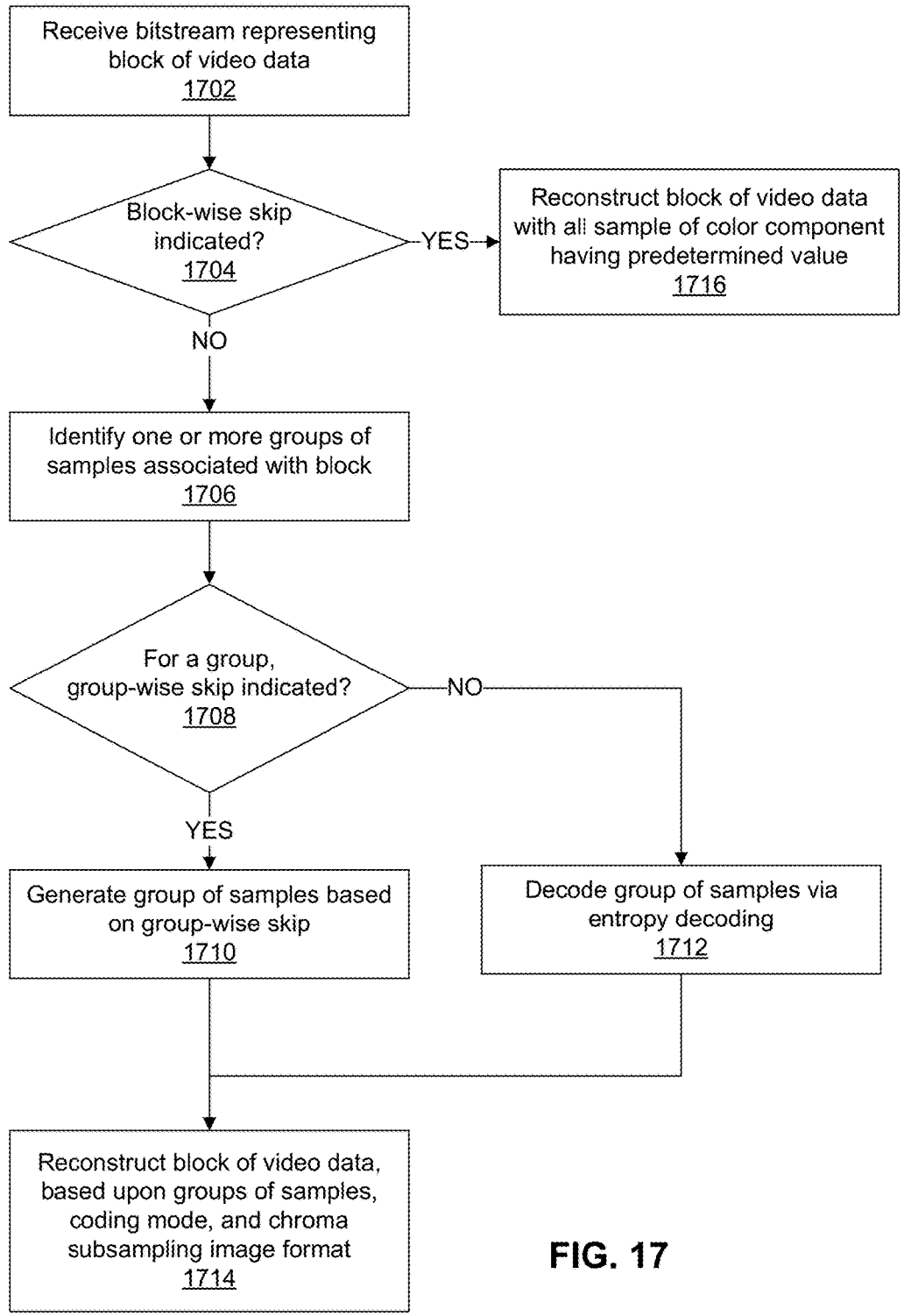
FIG. 17 illustrates a flowchart of an example method for entropy decoding a block of video data, in accordance with some embodiments.

FIG. 17 illustrates a flowchart of an example method for entropy decoding a block of video data, in accordance with some embodiments. At block 1702, the decoder receives a bitstream representing color components for a block of video data. At block 1704, the decoder determines whether a block-wise skip flag for the block has been indicated. If so, then at block 1716, the decoder reconstructs the block of video data, wherein all samples for a particular color component of the block have a predetermined value (e.g., 0). In some embodiments, the block-wise skip flag may not exist for certain color components of the block (e.g., luma components).

On the other hand, if the block-wise skip flag has not been indicated (or does not exist), then the process may proceed to block 1706. At block 1706, the decoder identifies one or more groups of samples associated with the block of video data. As discussed above, the group of samples may be coded using a coding mode and correspond to color components of the block of video data. In other embodiments, the group of samples may correspond to one or more coefficients obtained via one or more transforms being performed on the color components of the video block.

At block 1708, the decoder determines, for a group of the one or more groups, whether group-wise skip has been indicated for the group. In some embodiments, the decoder checks a value of a flag associated with the group, indicating whether the group was encoded using group-wise skip.

If it is determined that the group-wise skip has been indicated for the group, then at block 1710, the decoder may generate a group of samples based upon the group-wise skip. For example, the decoder may generate a group of samples all having a predetermined value (e.g., zero value).

On the other hand, if it is determined that group-wise skip has not been indicated for the group, then at block 1712, the decoder may use entropy decoding to decode the group of samples. For example, in some embodiments, the group of samples may have been coded using a prefix and one or more suffixes. The decoder may decode the prefix of a group to determine a number of bits of each suffix of the group, each suffix indicating the value of one or more samples. By decoding the prefix, the positions of all suffixes of the group in the bitstream can be determined, allowing for the suffixes of the group to be decoded in parallel, potentially increase video decoding throughput.

At block 1714, the decoder may reconstruct the block of video data, based upon the decoded groups of samples, the coding mode, and the chroma subsampling image format.

OTHER CONSIDERATIONS

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method of entropy encoding video data, comprising:
receiving a plurality of samples associated with a color component of a block of video data;
determining whether the plurality of samples is to be encoded using a skip mode, wherein the determination comprises determining whether all of the plurality of samples corresponding to the color component have a value equal to a predetermined value, the skip mode comprising refraining from encoding the plurality of samples; and
in response to determining that the plurality of samples is not to be encoded using the skip mode:
determining a chroma subsampling image format of the block, wherein the determined chroma subsampling image format of the block includes at least one of 4:2:2 or 4:2:0;
grouping the plurality of samples of the block of the video data into one or more groups of samples, wherein a number of groups of the one or more groups is based at least in part on a coding mode of the block, the determined chroma subsampling image format of the block, and the color component associated with the plurality of samples,
wherein when the chroma subsampling image format of the block is 4:2:2, the number of groups is N if the color component associated with the plurality of samples is a luma color component, and N/2 if the color component associated with the plurality of samples is a chroma color component, and
wherein when the chroma subsampling image format of the block is 4:2:0, the number of groups is N if the color component associated with the plurality of samples is the luma color component, and N/4 if the color component associated with the plurality of samples is the chroma color component; and
entropy encoding each group of the one or more groups of samples.

2. The method of claim 1, wherein the entropy encoding comprises coding a group of the one or more groups of samples using a prefix and a plurality of suffixes, the prefix indicating a length of each of the plurality of suffixes, and each suffix corresponds to a sample of the group.

3. The method of claim 1, wherein the entropy encoding comprises performing a group-wise skip on a group of the one or more groups of samples, in response to all of the samples in the group having a value equal to a predetermined value, the group-wise skip comprising refraining from encoding the samples associated with the group.

4. The method of claim 1, wherein each sample of the one or more groups of samples corresponds to a color component of a quantized residual value of the video block.

5. The method of claim 1, wherein each sample of the one or more groups of samples corresponds to a coefficient determined by applying a transform on a plurality of residual value color components of the video block, based upon the coding mode of the block.

6. The method of claim 5, further comprising:
signaling a position of a last sample of the one or more groups of samples having a significant value;
adjusting the coefficient corresponding to the last significant position by subtracting the absolute value of the coefficient by a predetermined value of 1;
entropy coding one or more samples having positions prior to the signaled position; and
not coding one or more remaining samples having positions after the signaled position.

7. The method of claim 6, further comprising signaling the sign bit corresponding to the last significant position, only when the adjusted last significant coefficient value is zero.

8. The method of claim 1, wherein the skip mode is applied only if the plurality of samples corresponds to chroma components, and not applied if the plurality of samples corresponds to luminance components.

9. A device for entropy encoding video data, comprising:
a memory configured to store the video data; and
a processor in communication with the memory and configured to:
receive a plurality of samples associated with a color component of a block of video data;
determine whether the plurality of samples is to be encoded using a skip mode, wherein the determination comprises determining whether all of the plurality of samples corresponding to the color component have a value equal to a predetermined value, the skip mode comprising refraining from encoding the plurality of samples; and
in response to a determination that the plurality of samples is not to be encoded using the skip mode:
determine a chroma subsampling image format of a block of the video data, wherein the determined chroma subsampling image format of the block includes at least one of 4:2:2 or 4:2:0;
group the plurality of samples of the block of the video data into one or more groups of samples, wherein a number of groups of the one or more groups is based at least in part on a coding mode of the block, the determined chroma subsampling image format of the block, and the color component associated with the plurality of samples,
wherein when the chroma subsampling image format of the block is 4:2:2, the number of groups is N if the color component associated with the plurality of samples is a luma color component, and N/2 if the color component associated with the plurality of samples is a chroma color component, and
wherein when the chroma subsampling image format of the block is 4:2:0, the number of groups is N if the color component associated with the plurality of samples is the luma color component, and N/4 if the color component associated with the plurality of samples is the chroma color component; and
entropy encode each group of the one or more groups of samples.

10. The device of claim 9, wherein the processor is configured to entropy encode the one or more group of samples by coding a group of the one or more groups of samples using a prefix and a plurality of suffixes, the prefix indicating a length of each of the plurality of suffixes, and each suffix corresponds to a sample of the group.

11. The device of claim 9, wherein the processor is configured to entropy encode the one or more group of samples by performing a group-wise skip on a group of the one or more groups of samples, in response to all of the samples in the group having a value equal to a predetermined value, the group-wise skip comprising refraining from encoding the samples associated with the group.

12. The device of claim 9, wherein each sample of the one or more groups of samples corresponds to a color component of a quantized residual value of the video block.

13. The device of claim 9, wherein each sample of the one or more groups of samples corresponds to a coefficient determined by applying a transform on a plurality of residual value color components of the video block, based upon the coding mode of the block.

14. The device of claim 13, wherein the processor is further configured to:
signal a position of a last sample of the one or more groups of samples having a significant value;
adjust the coefficient corresponding to the last significant position by subtracting the absolute value of the coefficient by a predetermined value of 1;
entropy code one or more samples having positions prior to the signaled position; and
not coding one or more remaining samples having positions after the signaled position.

15. The device of claim 14, wherein the processor is further configured to signal the sign bit corresponding to the last significant position, only when the adjusted last significant coefficient value is zero.

16. The device of claim 9, wherein the skip mode is applied only if the plurality of samples corresponds to chroma components, and not applied if the plurality of samples corresponds to luminance components.

17. A method of entropy decoding video data, comprising:
receiving a bitstream representing a block of the video data;
determining whether a skip mode flag has been indicated for a color component of the block indicating that samples corresponding to the color component of the block are not included in the bitstream; and
in response to a determination that the skip mode flag has not been indicated:
determining a chroma subsampling image format of the block, wherein the determined chroma subsampling image format of the block includes at least one of 4:2:2 or 4:2:0;
generating one or more groups of samples of the block via entropy decoding the bitstream, wherein a number of the one or more groups is based upon the determined chroma subsampling image format and a color component associated with the samples,
wherein when the chroma subsampling image format of the block is 4:2:2, the number of groups is N if the color component associated with the plurality of samples is a luma color component, and N/2 if the color component associated with the plurality of samples is a chroma color component, and
wherein when the chroma subsampling image format of the block is 4:2:0, the number of groups is N if the color component associated with the plurality of samples is the luma color component, and N/4 if the color component associated with the plurality of samples is the chroma color component; and
reconstructing the block based at least in part on the one or more groups of samples, a coding mode of the block, and the determined chroma subsampling image format.

18. The method of claim 17, wherein each sample of the one or more groups of samples corresponds to a color component of a residual value of the block.

19. The method of claim 17, further comprising:
identifying a signal in the bitstream indicating a position of a last sample of the one or more groups of samples having a significant value;
reconstructing one or more samples having positions prior to the signaled position using the received bitstream; and
reconstructing one or more remaining samples having positions after the signaled position as having a predetermined value.

20. The method of claim 17, further comprising:
identifying, from the received bitstream, a prefix and one or more suffixes corresponding to a group of samples of the one or more groups of samples;
decoding the prefix to determine a length of each of the one or more suffixes;
decoding the one or more suffixes in parallel to determine values of one or more corresponding samples of the group of samples.

21. A device for entropy decoding video data, comprising:
a memory configured to store at least a portion of a bitstream representing a block of the video data; and
a processor in communication with the memory and configured to:
determine whether a skip mode flag has been indicated for a color component of the block indicating that samples corresponding to the color component of the block are not included in the bitstream; and
in response to a determination that the skip mode flag has not been indicated:
determine a chroma subsampling image format of the block, wherein the determined chroma subsampling image format of the block includes at least one of 4:2:2 or 4:2:0;
generate one or more groups of samples of the block via entropy decoding the bitstream, wherein a number of the one or more groups is based upon the determined chroma subsampling image format and a color component associated with the samples,
wherein when the chroma subsampling image format of the block is 4:2:2, the number of groups is N if the color component associated with the plurality of samples is a luma color component, and N/2 if the color component associated with the plurality of samples is a chroma color component, and
wherein when the chroma subsampling image format of the block is 4:2:0, the number of groups is N if the color component associated with the plurality of samples is the luma color component, and N/4 if the color component associated with the plurality of samples is the chroma color component; and
reconstruct the block based at least in part on the one or more groups of samples, a coding mode of the block, and the determined chroma subsampling image format.

22. The device of claim 21, wherein each sample of the one or more groups of samples corresponds to a color component of a residual value of the block.

23. The device of claim 21, wherein the processor is further configured to:
identify a signal in the bitstream indicating a position of a last sample of the one or more groups of samples having a significant value;

reconstruct one or more samples having positions prior to the signaled position using the received bitstream; and reconstruct one or more remaining samples having positions after the signaled position as having a predetermined value.

24. The device of claim 21, wherein the processor is further configured to:

identify, from the received bitstream, a prefix and one or more suffixes corresponding to a group of samples of the one or more groups of samples;

decode the prefix to determine a length of each of the one or more suffixes;

decode the one or more suffixes in parallel to determine values of one or more corresponding samples of the group of samples.

* * * * *